US011282102B2

(12) United States Patent
Shin

(10) Patent No.: US 11,282,102 B2
(45) Date of Patent: Mar. 22, 2022

(54) METHOD FOR PROVIDING REWARDS BASED ON CONSUMPTION OF CONTENTS AND APPARATUS THEREOF

(71) Applicant: Sang Hyun Shin, Seoul (KR)

(72) Inventor: Sang Hyun Shin, Seoul (KR)

( * ) Notice: Subject to any disclaimer, the term of this patent is extended or adjusted under 35 U.S.C. 154(b) by 188 days.

(21) Appl. No.: 16/812,236

(22) Filed: Mar. 6, 2020

(65) Prior Publication Data

US 2020/0286115 A1     Sep. 10, 2020

(30) Foreign Application Priority Data

Mar. 8, 2019   (KR) .......................... 10-2019-0027124
Jul. 11, 2019   (KR) .......................... 10-2019-0083902

(51) Int. Cl.
    *G06Q 30/00*      (2012.01)
    *G06Q 30/02*      (2012.01)
    *G06Q 20/36*      (2012.01)

(52) U.S. Cl.
    CPC ..... *G06Q 30/0215* (2013.01); *G06Q 20/3678* (2013.01); *G06Q 30/0232* (2013.01)

(58) Field of Classification Search
None
See application file for complete search history.

(56) References Cited

U.S. PATENT DOCUMENTS

| | | | | |
|---|---|---|---|---|
| 3,553,444 A | * | 1/1971 | Tong | G06G 7/75 702/23 |
| 3,869,707 A | * | 3/1975 | Cupp | G11B 15/026 360/5 |
| 7,025,346 B1 | * | 4/2006 | Currans | H04N 1/00567 271/147 |
| 9,849,364 B2 | * | 12/2017 | Tran | A63B 69/36 |
| 11,128,636 B1 | * | 9/2021 | Jorasch | G10L 15/22 |
| 11,130,042 B2 | * | 9/2021 | Tran | A61B 5/11 |

(Continued)

FOREIGN PATENT DOCUMENTS

| | | |
|---|---|---|
| KR | 10-2011-0126993 A | 11/2011 |
| KR | 10-1679369 B1 | 11/2016 |
| KR | 10-2017-0082294 A | 7/2017 |

(Continued)

OTHER PUBLICATIONS

Minter Ellison. iSpy: how an Apple iOS feature can turn your iPhone into a listening device. (Feb. 13, 2019). Retrieved online Oct. 28, 2021. https://www.lexology.com/library/detail.aspx?g=0482c214-4190-4861-b309-83c7aa4a28a9 (Year: 2019).*

TRAF-SYS. How to Count Crowds & Measure Attendance at Events. (Apr. 15, 2008). Retrieved online Oct. 28, 2021. https://www.trafsys.com/how-to-handle-large-crowd-counting-for-special-events/ (Year: 2008).*

(Continued)

*Primary Examiner* — James A Reagan
(74) *Attorney, Agent, or Firm* — Studebaker & Brackett PC

(57) ABSTRACT

Provided is a method for providing a reward based on consumption of content performed by a computing device. The method comprises querying a user terminal located in a first space by using location information of a first space, measuring the number of users located in the first space according to the number of the queried user terminals and a first content playback record and calculating a first reward for the first content by using the measured number of users and the first content playback record, and providing the first reward to an account of a producer linked to a producer terminal of the first content.

16 Claims, 27 Drawing Sheets

(56) References Cited

U.S. PATENT DOCUMENTS

| | | | | | |
|---|---|---|---|---|---|
| 2001/0043364 | A1* | 11/2001 | Messner | | G06F 3/1279 |
| | | | | | 358/1.15 |
| 2007/0156443 | A1* | 7/2007 | Gurvey | | G06Q 10/02 |
| | | | | | 705/64 |
| 2010/0122174 | A1* | 5/2010 | Snibbe | | G06Q 10/10 |
| | | | | | 715/733 |
| 2012/0253957 | A1* | 10/2012 | Bakshi | | H04W 64/00 |
| | | | | | 705/18 |
| 2014/0223099 | A1* | 8/2014 | Kidron | | G06F 12/0806 |
| | | | | | 711/118 |
| 2016/0007060 | A1* | 1/2016 | Tremols | | H04N 21/26225 |
| | | | | | 725/95 |
| 2017/0232300 | A1* | 8/2017 | Tran | | H04L 67/10 |
| | | | | | 434/247 |
| 2017/0249656 | A1* | 8/2017 | Gantner | | G06Q 50/01 |
| 2018/0078843 | A1* | 3/2018 | Tran | | G09B 19/0038 |
| 2018/0350144 | A1* | 12/2018 | Rathod | | A63F 13/216 |
| 2019/0066087 | A1* | 2/2019 | Shayovitz | | G06Q 20/3224 |
| 2019/0158469 | A1* | 5/2019 | Gonzalez | | H04W 12/088 |
| 2019/0180311 | A1* | 6/2019 | Chan | | G06Q 30/0236 |
| 2020/0005284 | A1* | 1/2020 | Vijayan | | G06Q 20/02 |
| 2020/0286115 | A1* | 9/2020 | Shin | | G06Q 20/4015 |

FOREIGN PATENT DOCUMENTS

| | | |
|---|---|---|
| KR | 10-2018-0067977 A | 6/2018 |
| KR | 10-1888922 B1 | 8/2018 |

OTHER PUBLICATIONS

Andrew Farah. 7 Technologies that Count People (Buildings, Offices & Agnostic). (Jul. 23, 2018). Retrieved online Oct. 28, 2021. https://medium.com/density-inc/7-technologies-that-count-people-buildings-offices-742785d2030f (Year: 2018).*

Mohammad Yamin et al. Managing Crowds with Wireless and Mobile Technologies. (Aug. 1, 2018). Retrieved online Oct. 28, 2021. https://www.hindawi.com/journals/wcmc/2018/7361597/ (Year: 2018).*

James Cobb. People Counting & Customer Tracking: Counters vs Wifi vs Apps. (Oct. 10, 2018). Retrieved online Oct. 28, 2021. https://www.crowdconnected.com/blog/people-counting-customer-tracking-counters-vs-wifi-vs-apps/ (Year: 2018).*

An Office Action mailed by the Korean Patent Office dated Apr. 29, 2020, which corresponds to Korean Patent Application 10-2019-0083902 and is related to U.S. Appl. No. 16/812,236.

International Search Report issued in PCT/KR2020/003241; dated Jun. 15, 2020.

* cited by examiner

METHOD FOR PROVIDING REWARDS BASED ON CONSUMPTION OF CONTENTS AND APPARATUS THEREOF

CROSS-REFERENCE TO RELATED APPLICATIONS

This application claims the benefit of Korean Patent Application No. 10-2019-0027124 filed on Mar. 8, 2019 and Korean Patent Application No. 10-2019-0083902 filed on Jul. 11, 2019, in the Korean Intellectual Property Office, the disclosure of which is incorporated herein by reference in its entirety.

BACKGROUND

1. Field

The present disclosure relates to a method for providing a reward to a content producer. Specifically, the present invention relates to a method for providing a reward to a content producer based on the consumption of content.

2. Description of the Related Art

The copyright holder has the performance right which is the right to allow or prohibit the performance or playback of his/her created content. Playing music downloaded through a web hard or P2P in a commercial facility violates the performance right, and playing digital music purchased from a site providing a formal digital music service also violates the performance right. That is, even when playing content in a business facility through a digital music service, a fee should be paid to the copyright holder.

However, most of the reward is made by paying according to the area of the business facility, and the reward based on the consumption of contents, that is, how many users consumed the content in the business facility, is not made.

Therefore, it is necessary to provide a method for the copyright holder to be compensated for a reasonable price according to the consumption of the content.

SUMMARY

An embodiment of the present disclosure is to provide a method and system for providing a reward to a producer of content by measuring the number of users, who consumed the content while the content is playing.

Another embodiment of the present disclosure is to provide a method and system for accurately measuring the number of users, who consumed content, and providing a reward to the producer of the content accurately.

Still another embodiment of the present disclosure is to provide a method and system for providing a reward to a user, who consumed the content, and a space provider through advertisement fees.

Embodiments of the present disclosure are not limited to the above-mentioned embodiments, and other embodiments not mentioned will be clearly understood by those skilled in the art from the following description.

According to an embodiment of the present disclosure, a method for providing a reward based on consumption of content is performed by a computing device, the method comprises querying a user terminal located in a first space by using location information of a first space, measuring the number of users located in the first space according to the number of the queried user terminals and a first content playback record, calculating a first reward for the first content by using the measured number of users and the first content playback record, and providing the first reward to an account of a producer linked to a producer terminal of the first content.

According to another embodiment of the present disclosure, a method for providing a reward based on consumption of content is performed by a computing device, the method comprises obtaining information about a user of the user terminal entering a first space from a space provider terminal, measuring the number of users located in the first space according to the information about the user, and calculating a first reward for the first content by using the measured number of users and a first content playback record in the first space, and providing the first reward to an account of a producer linked to a producer terminal of the first content.

According to an embodiment of the present disclosure, an apparatus for providing a reward based on consumption of content comprises a memory for storing one or more instructions, and a processor, by executing the stored one or more instructions, for querying a user terminal located in a first space by using location information of a first space, measuring the number of users located in the first space according to the number of the queried user terminals and a first content playback record, calculating a first reward for the first content by using the measured number of users and the first content playback record, and providing the first reward to an account of a producer linked to a producer terminal of the first content.

According to an embodiment of the present disclosure, a program is stored in a computer readable recording medium, the program executes a method for providing a reward based on consumption of content in conjunction with a computing device, the method comprises querying a user terminal located in a first space by using location information of a first space, measuring the number of users located in the first space according to the number of the queried user terminals and a first content playback record, calculating a first reward for the first content by using the measured number of users and the first content playback record, and providing the first reward to an account of a producer linked to a producer terminal of the first content.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
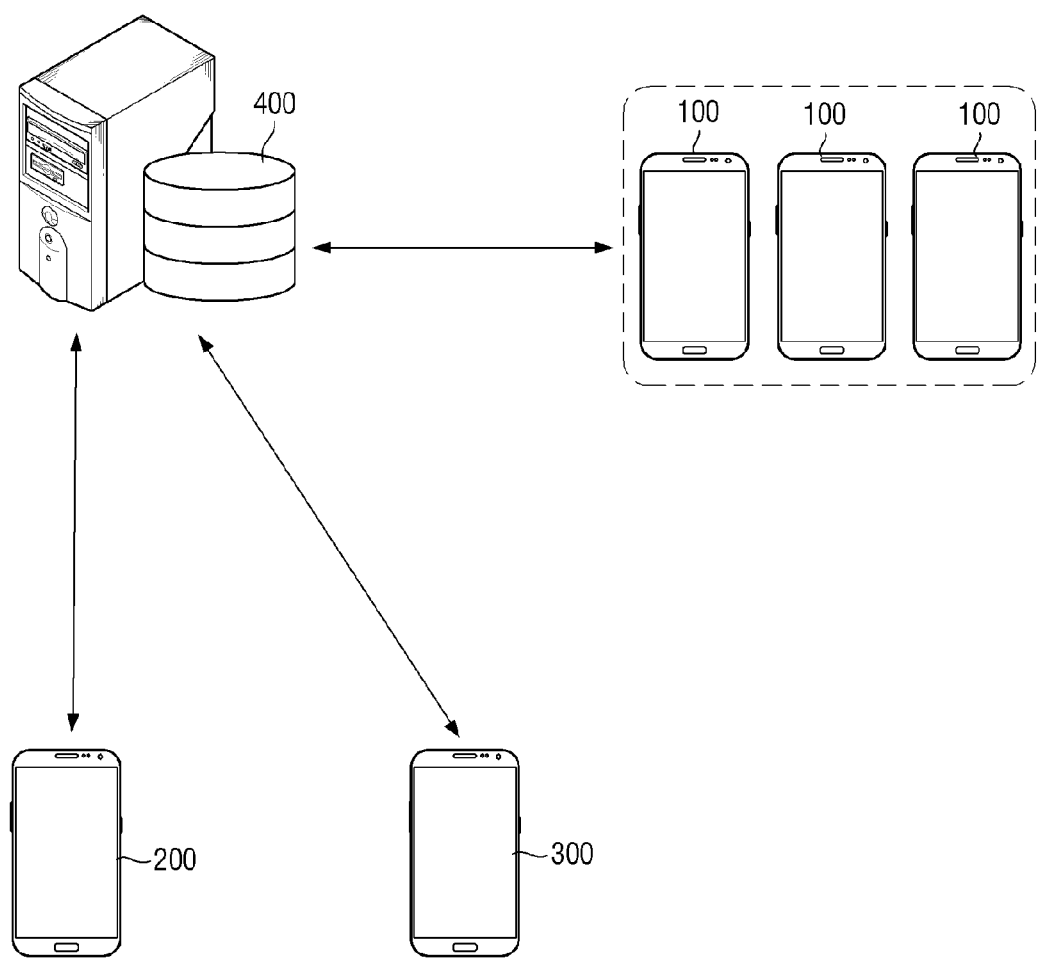
FIG. 1 is a block diagram of a system for providing a reward according to the consumption of content according to some embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected." "coupled" or "contacted" to another component, that component may be directly connected to or contacted with that other component, but it should be understood that another component also may be "connected." "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present invention will be described in detail with reference to the accompanying drawings.

FIG. 1 is an exemplary block diagram illustrating a system for providing a reward according to the consumption of content according to some embodiments of the present disclosure.

As shown in FIG. 1, a reward providing system based on the consumption of content according to some embodiments of the present disclosure may include a server 400, one or more user terminals 100, a space provider terminal 200 and a producer terminal 300. However, this is only a preferred embodiment for achieving the object of the present disclosure, of course, some components may be added or deleted as necessary. Hereinafter, each component is briefly described.

The server 400 is a computing device or system that provides a reward providing service according to the content consumption, and may be configured with one or more server devices (i.e., computing devices). Here, the computing device may be a laptop, a desktop and the like, but is not limited thereto and may include all kinds of devices equipped with a computing function and a communication function. Some examples of such computing devices are described in detail below with reference to FIG. 27.

The user terminal 100 is a computing device used by a user, who enters a specific space and consumes content played in the specific space. The user terminal 100 may be a smart phone, a smart watch, or the like, but is not limited thereto and may include any device provided with a computing means and a communication means.

The space provider terminal 200 is a computing device used by the person providing the space, and the producer terminal 300 is a computing device used by the user, who produced the content. Here, the space provider terminal 200 and the producer terminal 300 may be a smart phone, a smart watch, etc. like the user terminal 100, but is not limited thereto, and includes any device provided with a computing means and a communication means.

Here, the producer terminal 300 for producing and creating content is the same component as the creator terminal 300, hereinafter the producer terminal 300 may be used interchangeably with the name of the creator terminal 300, the producer can be used interchangeably with the name of the creator.

In some embodiments, an application (APP) is downloaded to the user terminal 100, the space provider terminal 200, and the producer terminal 300, and a service for providing a reward for content consumption may be used through the APP. The application (APP) refers to an application that can be executed on a smart device such as a smart phone or a smart TV. Hereinafter, it will be described in detail with reference to FIG. 2.

The content producer, the space provider and the user each may install the APP that provides a content providing service in the producer terminal 300, the space provider terminal 200 and the user terminal 100, and may subscribe a membership through the APP. At this time, the producer terminal 300 may register the content produced by itself.

When the content is played in the first space, the space provider terminal 200 transmits the first content playback record of the first space to the server 400 using the APP. That is, the time, for which the content is played in the first space, can be recorded in the server. The server 400 may query the user terminal 100 located in the first space based on the transmitted location information of the first space. In response to the query, the user terminal 100 may transmit information about the location of the user of the user terminal 100 to the server 400.

The server 400 may measure the number of users in the space by using the location information of the user received from the user terminal 100. For example, the server 400 may receive location information of the user terminal 100 measured from a positioning module included in the user terminal 100 such as GPS. However, it is not limited thereto. At this time, the server 400 may correct the measured number of users in order to give the producers an accurate reward for using the content. Different methods may be used for correcting the measured number of users according to the type of space.

For example, in a space, where a ticket gate is clearly present (e.g., amusement park, museum, theme park, etc.), the number of users can be corrected by whether the user terminal 100 entered the ticket gate, and in a space, where the ticket gate is not clear (e.g., coffee shop, restaurant, shop, etc.), the number of users can be corrected by using a receipt for purchasing goods in the space. Further, in the case of a space, where a usage time exists, such as a movie theater or a concert hall, the number of users may be corrected by being located in the space during the predetermined usage time.

In some embodiments, the server 400 may correct the number of users in consideration of the state of users located in the space as well as the type of space. For example, in the case of a user, who is located in a space but does not consume the content, the user may be corrected to be excluded from the number of users. However, the present invention is not limited thereto, and any method for clearly measuring and correcting the number of users, who actually consumed the content, can be applied. It will be described in detail with reference to FIG. 3 below.

The server 400 may calculate a reward according to the measured number of users and the rating of the first content. The rating of the first content refers to a score that reflects the type, length, and grade of the content. For example, movie content that is video content may be given a higher rating than music content that is voice content. However, it is not limited thereto.

The rating may be determined when the content producer registers the content to the APP, and may then change according to the content usage record. The server 400 provides the producer terminal 300 with the calculated reward.

When the content is played, the server 400 may set advertising content to be played in the middle of the play. Alternatively, the advertising content may be set to be played after the playing of the first content is finished and before the playing of the second content is started. In this case, a portion of the revenue generated from the played advertising content may be provided as a reward to the content producer. However, in the case of advertising content, measuring the number of consumed at the moment, when the advertising content is played, may be somewhat unfair. Therefore, various measurement methods are needed. For example, the reward may be paid according to a percentage of time occupied by the content in the space corresponding to the date, on which the advertisement is played. Furthermore, as for the advertising content, a reward may be provided to the space provider terminal 200 and the user terminal 100 as well as the producer terminal 300. That is, a part of the revenue of the advertising content can be shared with both the space provider, who provided the space, and the user, who actually consumed the advertisement.

In some embodiments, the database for advertisement revenue sharing uses a specially processed database. In some embodiments, advertisement revenue sharing may be recorded in the blockchain and transparently processed to both advertisers, content producers, space providers and users.

The components shown in FIG. 1 can communicate via a network. The network may be implemented with any type of wired/wireless network such as a local area network (LAN), a wide area network (WAN), a mobile radio communication network, a wireless broadband Internet (Wibro), or the like.

Figure 2:
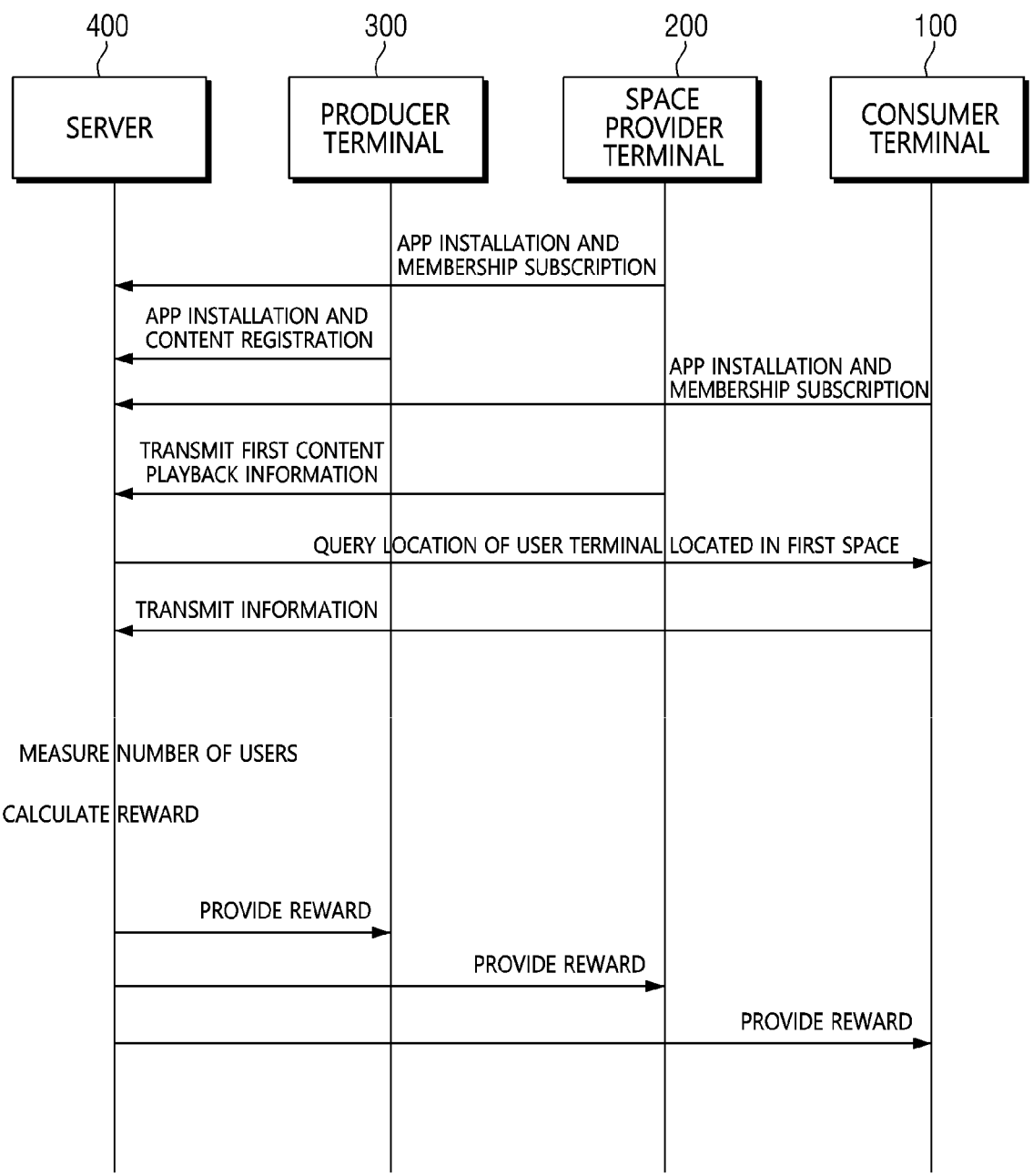
FIG. 2 is a flowchart of a method for providing a reward according to the consumption of content according to some embodiments of the present disclosure.

So far, the system for providing a reward according to the consumption of content according to some embodiments of the present disclosure has been described with reference to FIGS. 1 and 2. Hereinafter, a method for providing a reward according to the consumption of content according to some embodiments of the present disclosure will be described in detail with reference to FIGS. 3 to 21.

Each step of the method for providing a reward according to the consumption of the content may be performed by a computing device. In other words, each step of the method for providing a reward according to the consumption of content may be implemented with one or more instructions executed by a processor of the computing device.

An instruction is a series of computer readable instructions, grouped by function, that is a component of a computer program and executed by a processor.

All steps included in the method for providing a reward according to the consumption of content may be executed by one physical computing device, but the first steps of the method may be performed on the first computing device and the second steps of the method may be performed by a second computing device.

The method for providing a reward according to the consumption of the content may be performed in various systems and/or environments. However, the description of the environment illustrated in FIG. 1 continues for the convenience of understanding. Further, unless otherwise mentioned, it is assumed that each step of the method for providing a reward according to the consumption of the content is performed by the server 400. Thus, when the subject of each operation is omitted, it will be understood that each operation is performed by the illustrated apparatus 400. In addition, the methods described below may be changed in order of operations within a range, in which the execution order may be logically changed as necessary.

Figure 3:
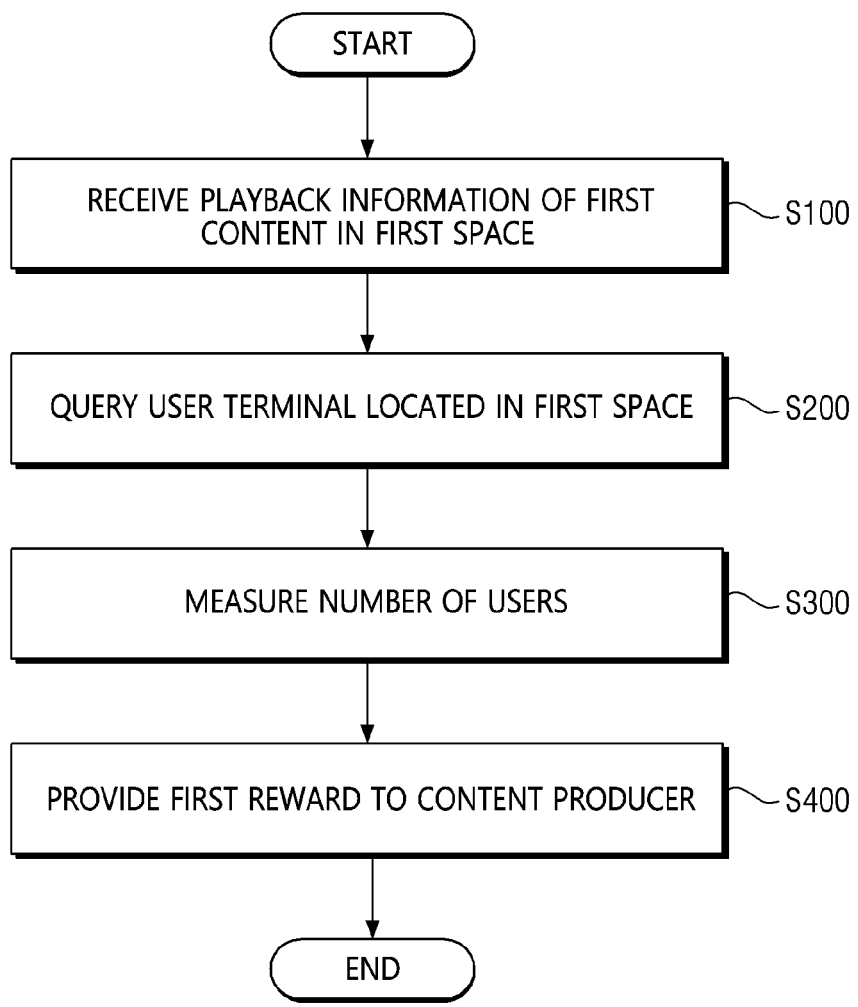
FIG. 3 is a flowchart of a method for providing a reward according to the consumption of content according to some embodiments of the present disclosure.

FIG. 3 is an exemplary flowchart illustrating a method for providing a reward according to the consumption of content according to some embodiments of the present disclosure. However, this is only a preferred embodiment for achieving the object of the present disclosure, of course, some steps may be added or deleted as necessary.

Referring to FIG. 3, first, playback information of a first content is received in a first space (S100). For example, the server 400 may receive information of playing the first content from the space provider terminal 200 in the first space, and the method of receiving the information may be any method.

In some embodiments, the space provider terminal 200 may have an APP installed and subscribed to a service providing the present disclosure through the APP. When the first content is played, the information of playing the first content is transmitted to the server, and the first content playback record of the first space may be recorded in the server 400.

If the first content is pre-registered with a service company providing the APP service, the space provider terminal 200 may play the first content through the APP. If the first content is not pre-registered with the service company providing the APP service, it may be played through a player other than the APP. In this case, when the first content is played through the APP, a reward according to a higher advertisement revenue may be provided than when the first content is played through the other player. However, it is not limited thereto.

Next, the user terminal located in the first space is queried in response to the first content playback information received in step S100 (S200). The query step S200 may be performed using location information of the user terminal 100. Hereinafter, it will be described in detail with reference to FIG. 4.

Figure 4:
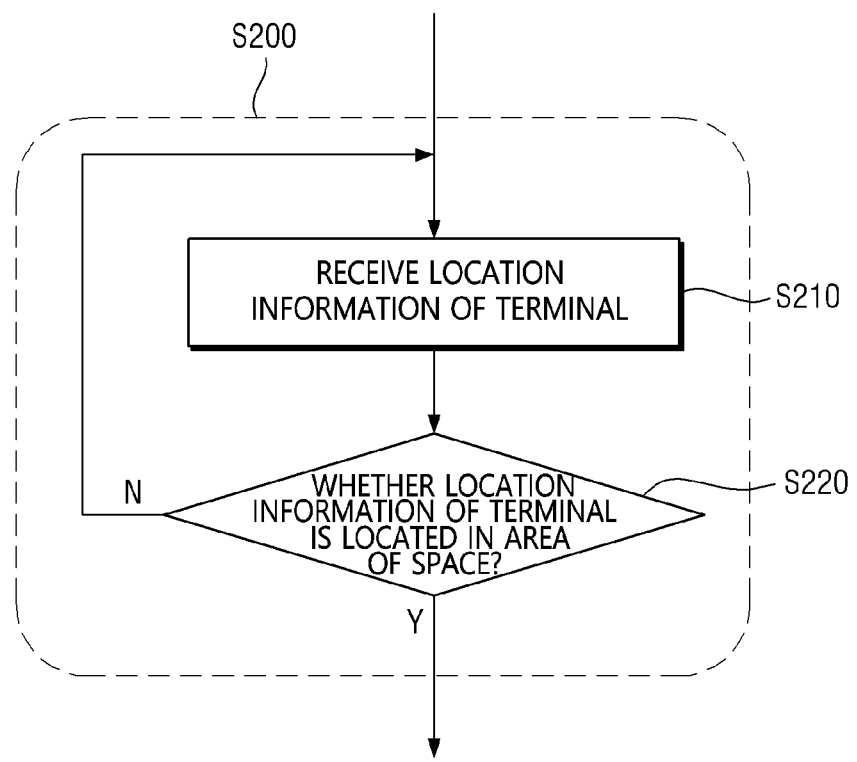
FIG. 4 is a flowchart for describing a method of querying a user terminal located in a first space in step S200 of FIG. 3.

Referring to FIG. 4, in the query step S200, location information of the user terminal 100 is first received (S210). For example, GPS may be used to receive the location information of the user terminal 100, but it is not limited thereto.

Next, it is determined whether the location information of the user terminal 100 is located in the area of the space (S220). At this time, location information of the first space may also be used. For example, the range of the first space is set using the location information of the first space and when the location of the user terminal 100 is within the range of the first space using the location information of the user terminal 100, it may be determined whether the user terminal 100 is located in an area of the space. However, it is not limited thereto.

Subsequently, when it is determined that the user terminal 100 is located in the area of the space, the user number measuring step S300 illustrated in FIG. 3 is performed. And, when the user terminal 100 is determined to be located outside the space, location information of the other user terminal 100 is received with returning to step S210 again.

Figure 5:
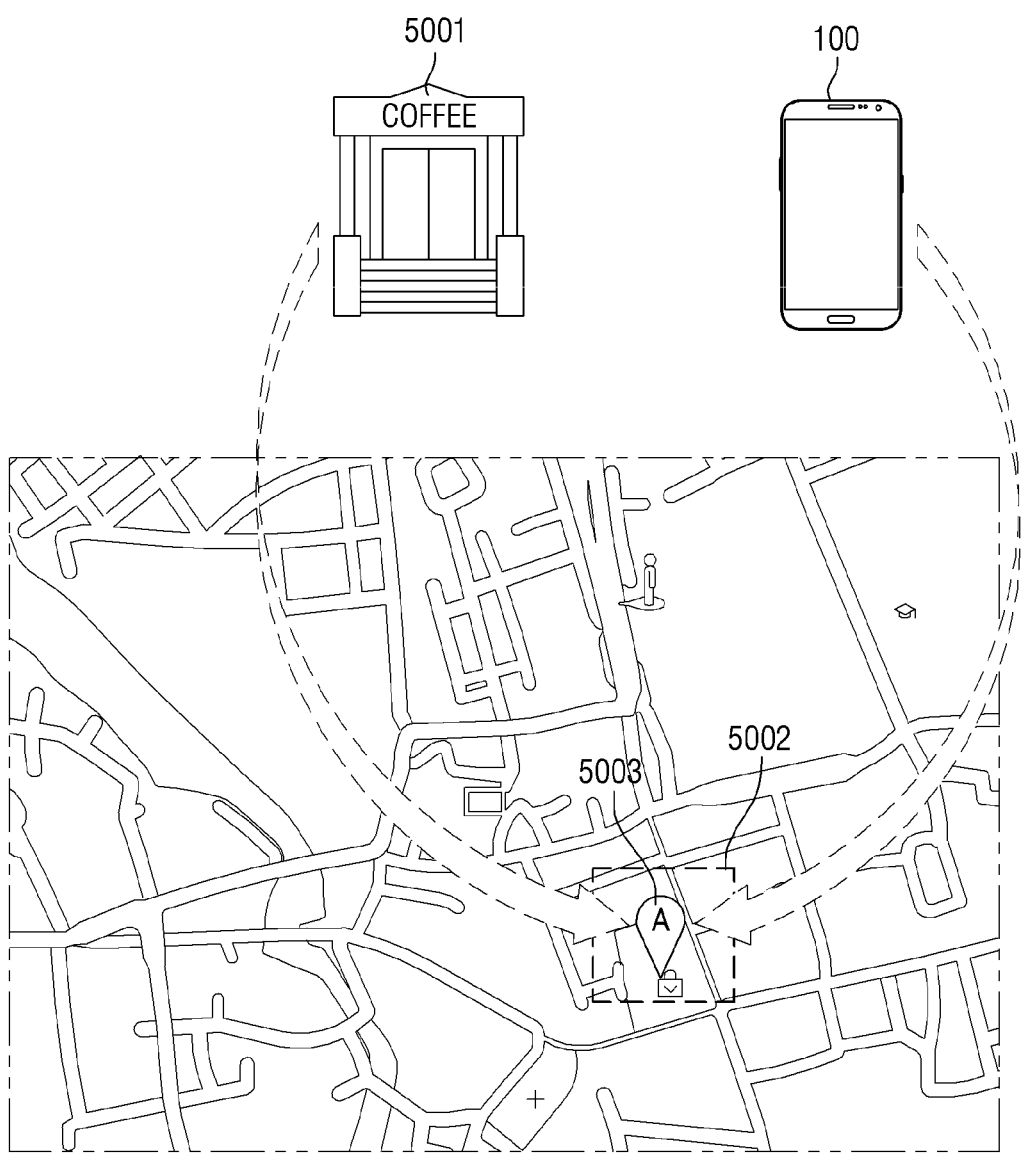
FIG. 5 is a conceptual diagram for describing FIG. 4 in detail.

More details will be described with reference to FIG. 5. FIG. 5 illustrates a coffee shop 5001 as an example of the first space. Further, the area recognized as the space 5002 of the coffee shop 5001 based on the location information of the coffee shop 5001 is displayed on the map. Referring to FIG. 5, it can be seen that the location 5003 displayed on the map based on the location information of the user terminal 100 is located in the space 5002 of the coffee shop 5001. In this case, the user of the user terminal 100 may be regarded as being located in the space of the coffee shop 5001.

Figure 6:
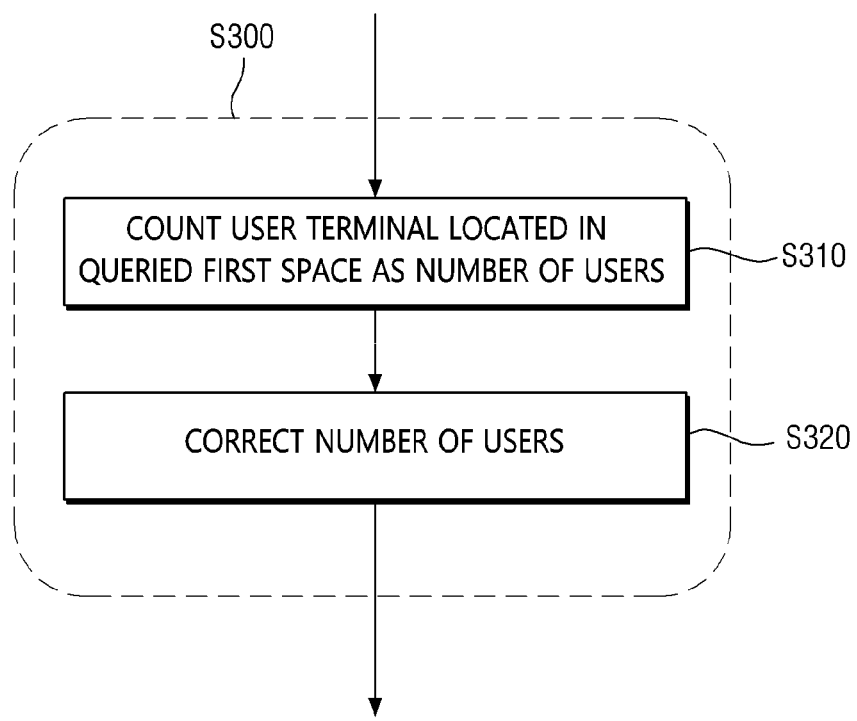
FIG. 6 is a flowchart for describing a method of measuring the number of users in step S300 of FIG. 3.

This will be described with reference to FIG. 3 again. After step S200, the number of users is measured using the user terminal 100 queried to be located in the first space and the first content playback record (S300). For example, as shown in FIG. 6, by counting the user terminal 100 located in the first space queried through step S200, the number of user terminals 100 located in the first space is measured as the number of users (S310). Then, the number of users measured in step S310 is corrected (S320). At this time, the method of correcting the number of users may vary according to embodiments.

Figure 7:
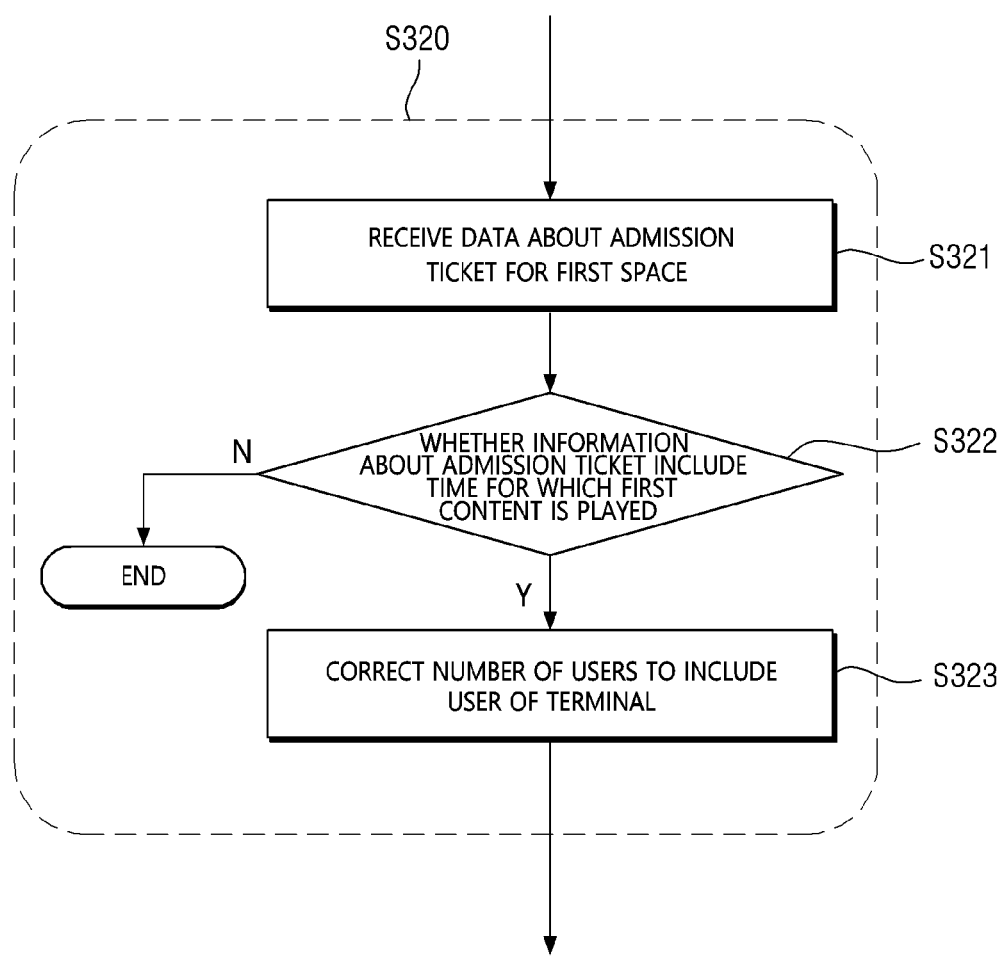
FIG. 7 is a flowchart for describing a method of correcting the number of users in step S320 of FIG. 6.

In some embodiments, the method of correcting the number of users may be determined based on admission ticket information. For example, as shown in FIG. 7, data on admission ticket of the first space is received from the space provider terminal 200 of the first space (S321). Here, the data on the admission ticket may be data using a mobile admission ticket stored in the user terminal 100, or may be data, which is a text extracted from an image recognized using a camera of the user terminal 100. This will be described in detail with reference to FIG. 8.

Figure 8:
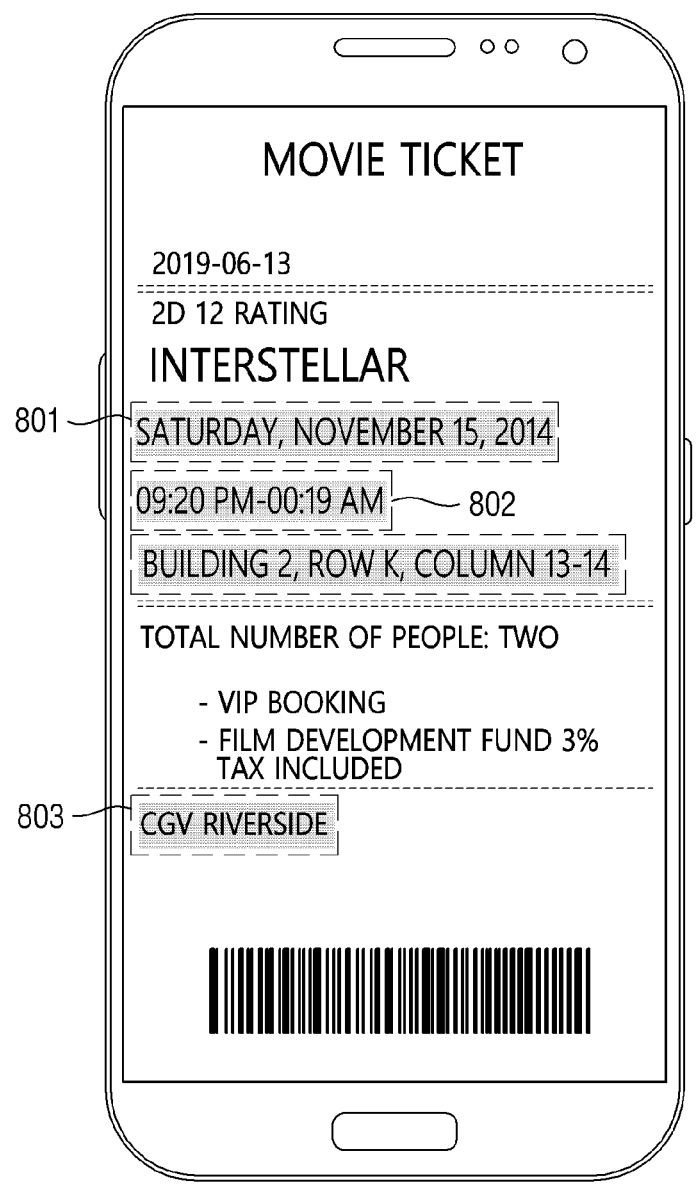
FIGS. 8 to 14 are conceptual diagrams for describing a method of correcting the number of users described in FIG. 7.

FIG. 8 is a diagram illustrating a movie admission ticket displayed on the user terminal 100 by being recognized by a camera of the user terminal 100. In this case, the text about the place information 803, the date information 801, and the time information 802 may be extracted from the text information of the movie admission ticket. For example, text information may be extracted from a movie admission ticket using a string analysis technology, such as OCR, but it is not limited thereto. In FIG. 8, the CGV riverside is extracted as the place information 803, Saturday, Nov. 15, 2014 is extracted as the date information 801, and from 9:20 pm to 00:19 is extracted as the time information 802.

Figure 9:
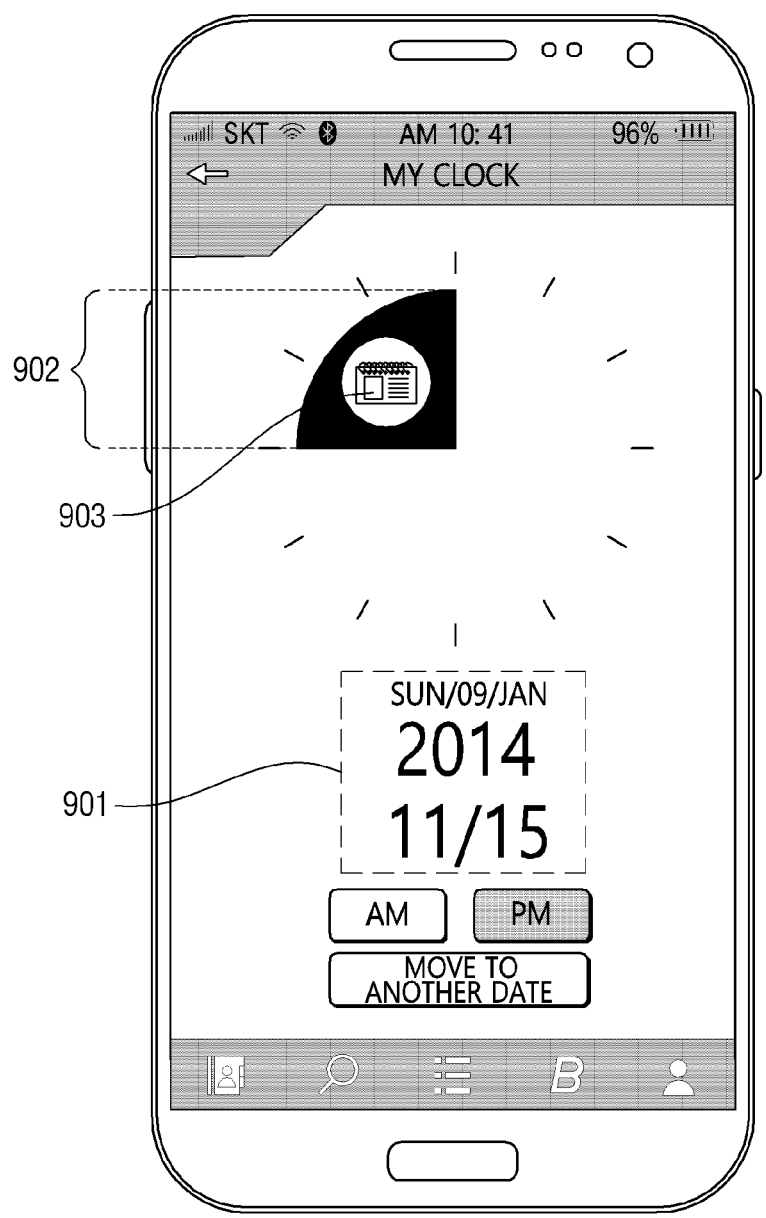

In some embodiments, the extracted data may be stored in a user account linked to the user terminal 100. It will be described with reference to FIG. 9. FIG. 9 illustrates a screen reflected in a user account linked to a user terminal by using the data extracted in FIG. 8.

Referring to FIG. 9, the content of the admission ticket is reflected on a date 901 corresponding to the date information 801 of FIG. 8. In detail, the time corresponding to the time information 802 of FIG. 8 is displayed as much as the time information 902 corresponding to the icon represented by the clock. The user may intuitively grasp the schedule through the scheduler. Hereinafter, each time area stored in the scheduler is called a time ticket. Hereinafter, with reference to FIGS. 10 to 12, a form, in which detailed information 1101 including space information of the first time ticket is displayed as the first time ticket is selected, will be described.

Figure 10:
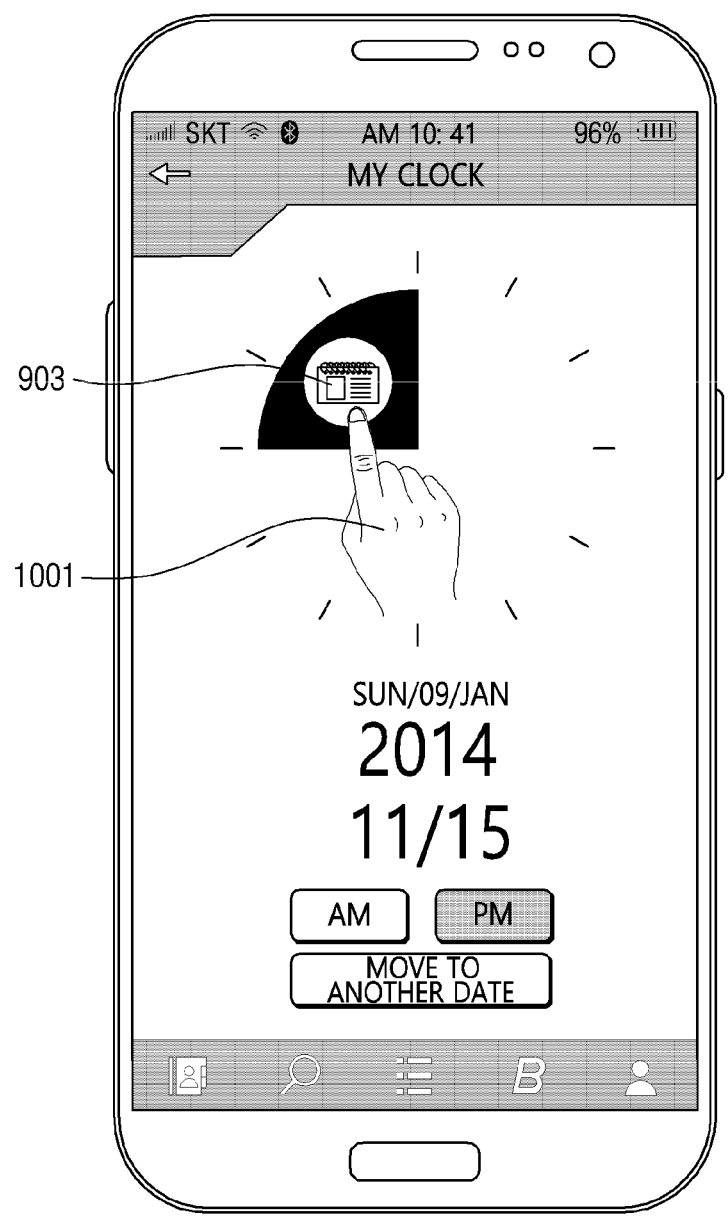
Figure 11:
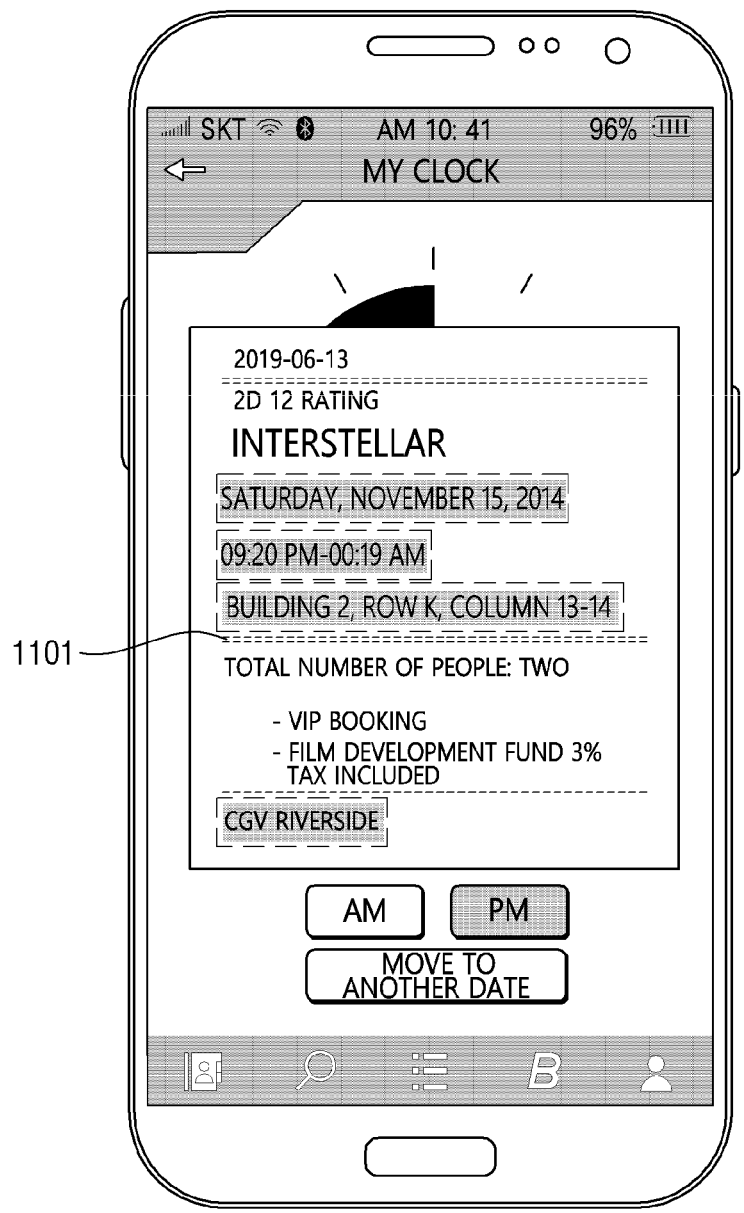

As shown in FIG. 10, an input 1001 may be applied to the time information area 902. The input 1001 may be possible in various ways, such as a click input or a touch input. In response to the input, the detailed information 1101 may be displayed as shown in FIG. 11.

Figure 12:
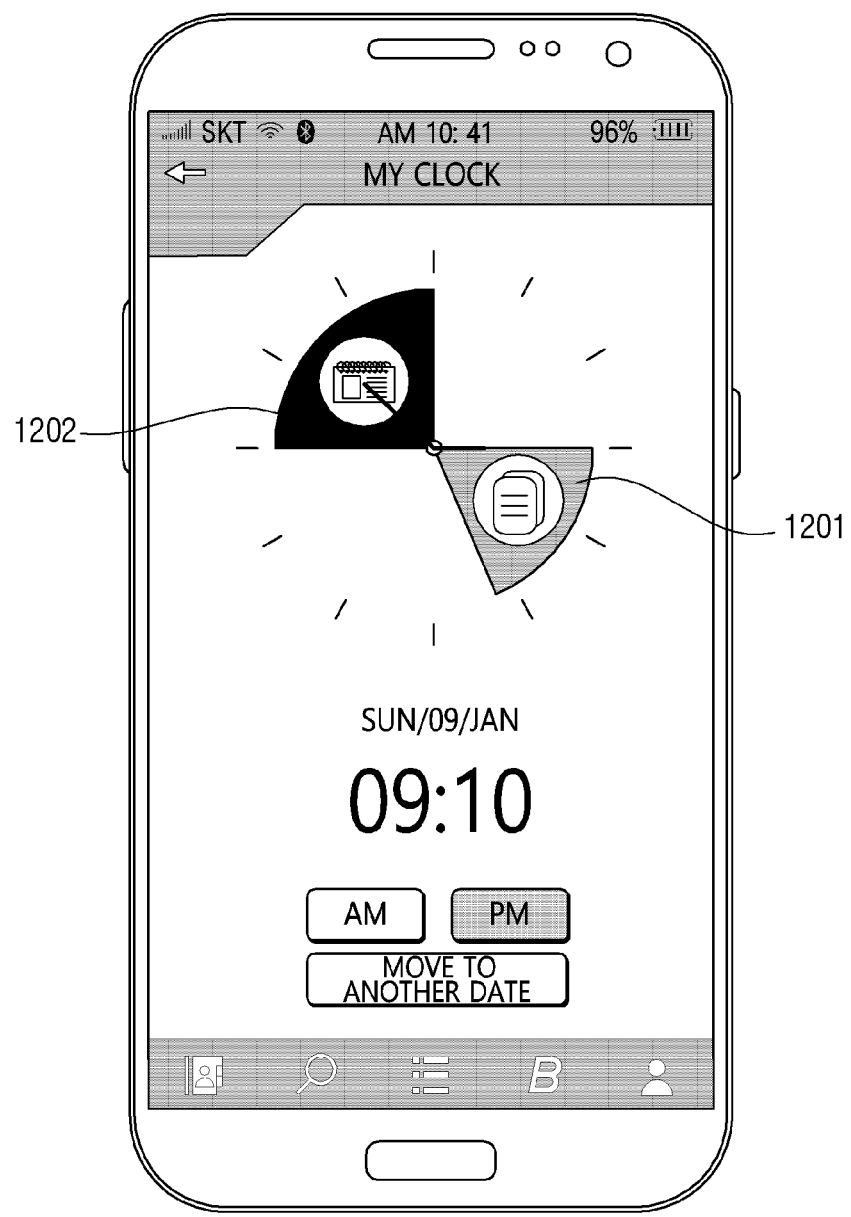

FIG. 12 shows a case, where two time tickets are stored on the same day. In detail, the first time ticket 1201 of from 3 pm to 5 pm on Sunday, January 9, and the second time ticket 1202 of from 9 pm to 12 pm are displayed. Information on the space, where the user of the user terminal is to be located on the date, may be input in advance to the user terminal, and the information may be transmitted in advance to the server.

Referring back to FIG. 7, it is determined whether the time information on the admission ticket received in step S321 includes a time, for which the first content is played (S322). When the time information on the admission ticket includes a time, for which the first content is played, the first reward providing step S400 of FIG. 3 is performed. And, when the time information on the admission ticket does not include the time, for which the first content is played, the process ends. It will be described in detail with reference to FIGS. 13 to 14.

Figure 13:
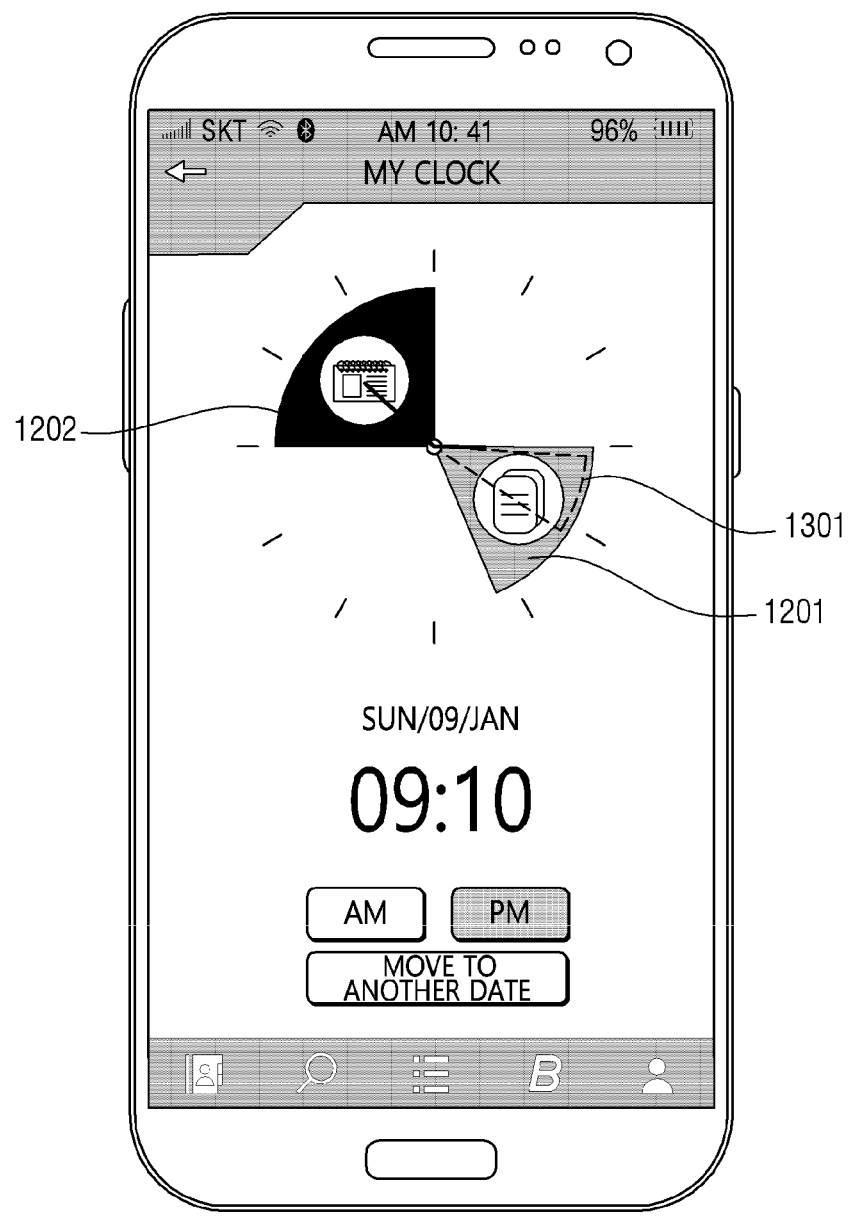
Figure 14:
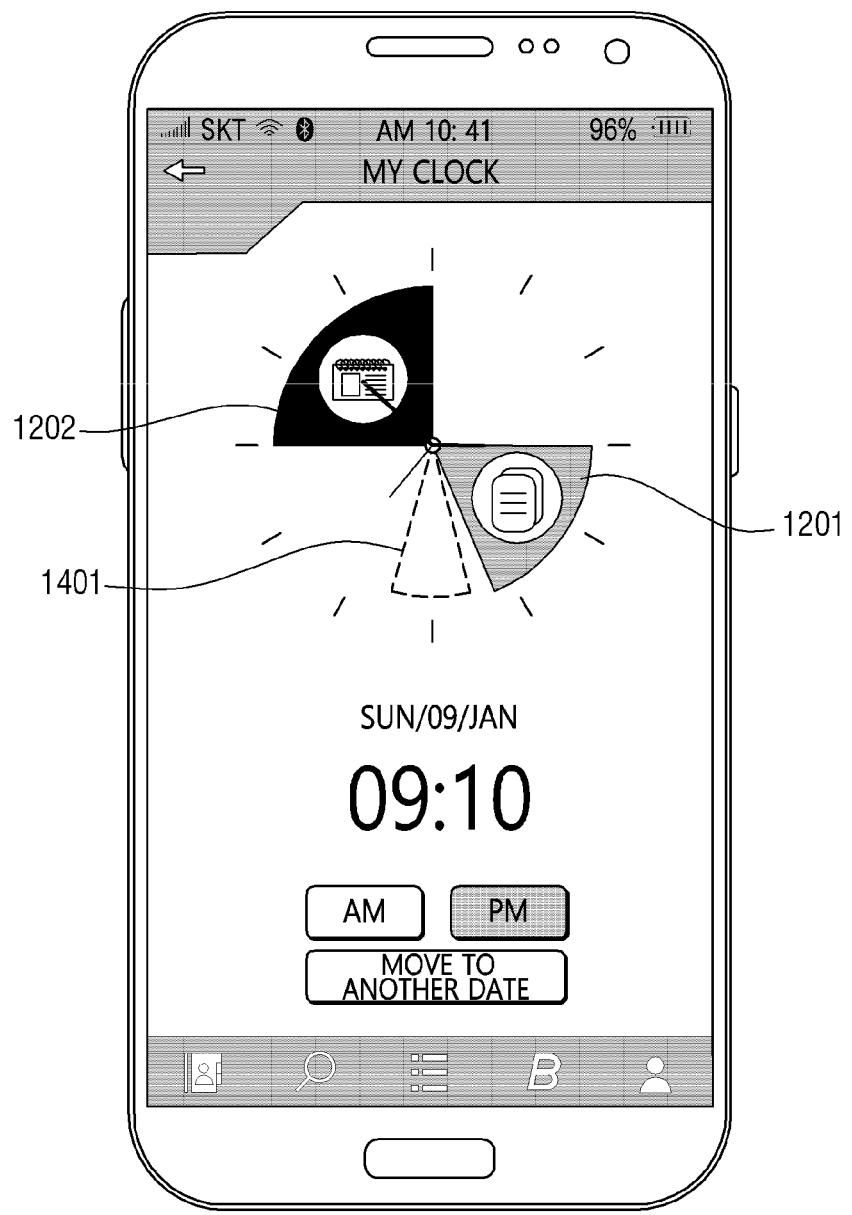

Like FIG. 12, FIGS. 13 to 14 illustrate the case where two time tickets are stored. In detail, the first time ticket 1201 of from 3 pm to 5 pm on Sunday, January 9 in the first space and the second time ticket 1202 of from 9 pm to 12 pm in the second space are shown.

It is assumed that the time 1301, for which the first content is played, is between 3 pm and 4 pm. As shown in FIG. 13, the time 1301, for which the first content is played, is included in the area of the first time ticket 1201. That is, it can be seen that the user of the user terminal is located in the first space during the time 1301, for which the first content is played in the first space, by using the time ticket stored in the user terminal.

In contrast, referring to FIG. 14, the time 1401, for which the second content is played, is not included in the area of the first time ticket 1201 or the area of the second time ticket 1202. That is, it can be seen that the user of the user terminal is not located in the first space during the time 1401, for which the second content is played in the first space, by using the time ticket stored in the user terminal. The effect that the number of users can be accurately measured even when the power of the first user terminal is turned off or the user does not carry the user terminal is yielded.

However, in the case of a space where a separate admission ticket does not exist, such as a coffee shop, time tickets cannot be generated according to the admission ticket. Therefore, a separate method is required.

In some embodiments, the method of correcting the number of users may use a method of correcting the number of users by using whether or not to purchase an item sold in the space. This will be described with reference to FIGS. 15 to 18.

Figure 15:
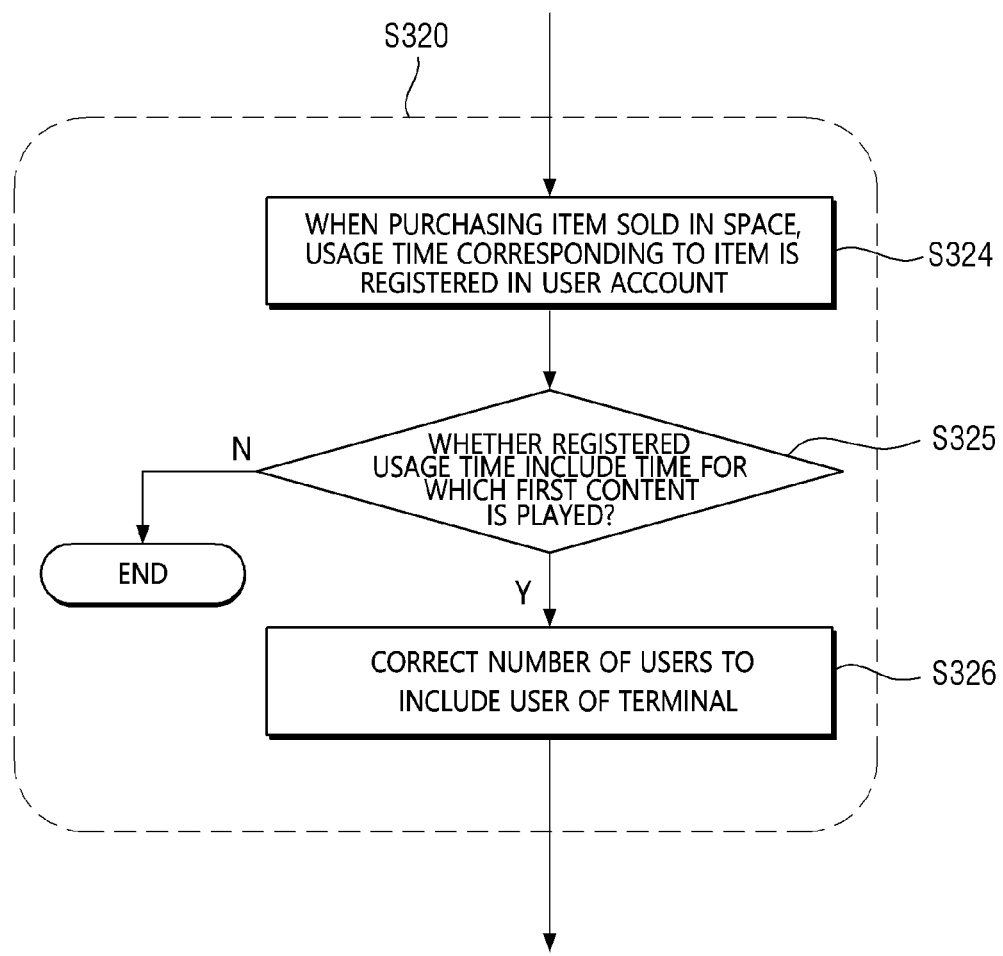
FIG. 15 is another flowchart for describing a method of correcting the number of users in step S320 of FIG. 6.

FIG. 15 is a flowchart of a method, in which the number of users is corrected based on whether or not to purchase an item sold in a space. Referring to FIG. 15, first, when an item sold in a space is purchased, a usage time corresponding to the item is registered in a user account (S324). It will be described with reference to FIG. 16.

Figure 16:
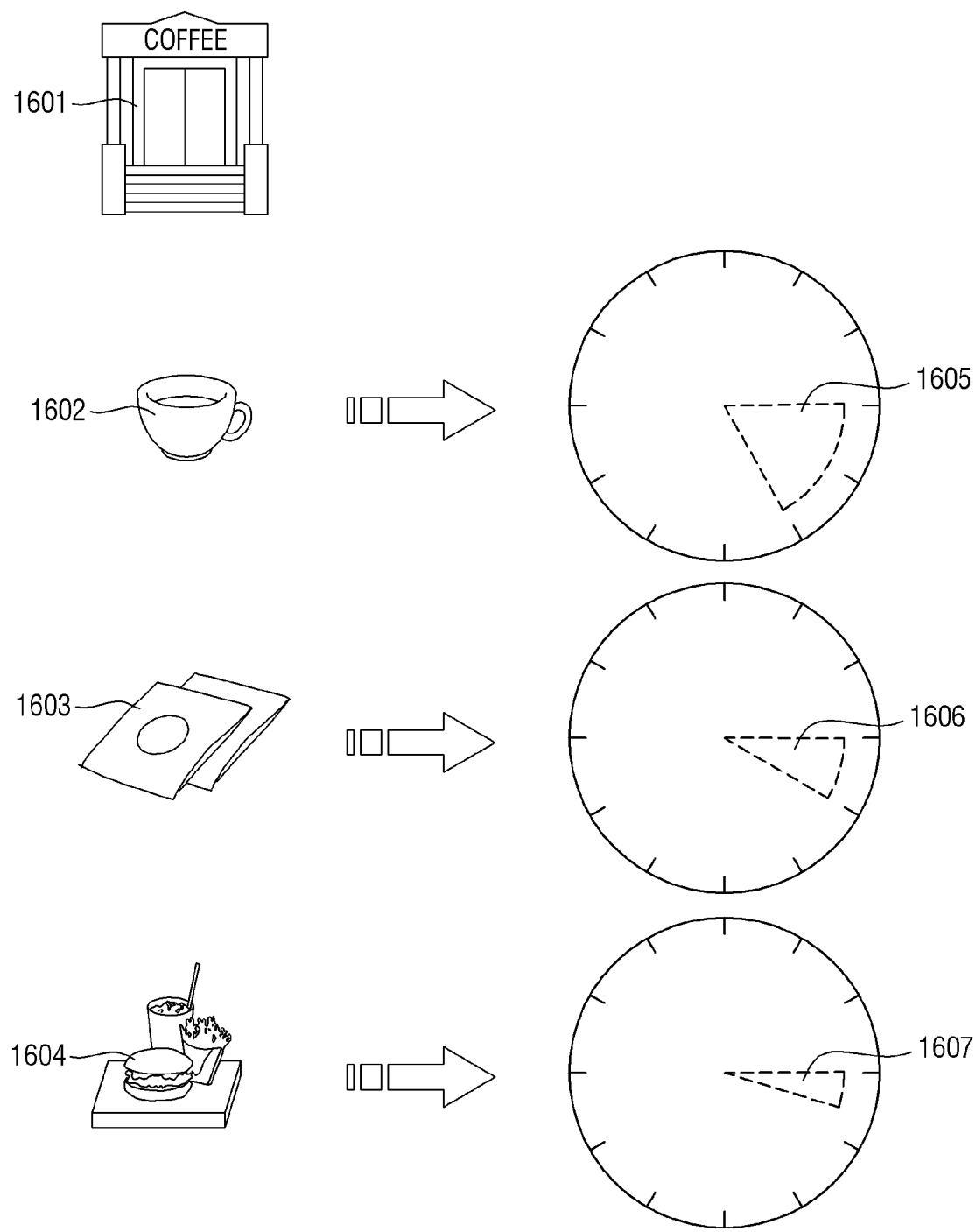
FIG. 16 is a conceptual diagram for describing in detail a method of registering a usage time corresponding to an item in a user account when purchasing the item sold in the space in step S320 of FIG. 15.

FIG. 16 illustrates a case, where the first space is a coffee shop 1601. The usage time corresponding to the item sold in the coffee shop 1601 may be registered. The usage time may be registered in proportion to the price of each item. However, it is not limited thereto.

As illustrated in FIG. 16, when a coffee pot 1602, which is an expensive item among items sold in the coffee shop 1601, is purchased, a two-hour usage time may be registered as the first time ticket 1605.

When coffee beans 1603 are purchased, one-hour of usage time may be registered as the second time ticket 1606, and when coffee or sandwich 1604 is purchased, the thirty minutes of usage time may be registered as the third time ticket 1607.

The purchase status may be confirmed in a manner, in which a user authenticates using a space provider terminal, or may be confirmed in a manner, in which a receipt for the purchased item is recognized.

Referring back to FIG. 15, it is determined whether the usage time registered in step S324 includes a time, for which the first content is played (S325). If the registered usage time includes the time, for which the first content is played, step S326 is performed.

Thereafter, when it is determined that the usage time registered in step S325 includes a time, for which the first content is played, the number of users is corrected to include the user of the terminal (S326). On the contrary, if the registered usage time does not include the time, for which the first content is played, the process ends without additional correction. Hereinafter, it will be described in detail with reference to FIGS. 17 to 18.

Figure 17:
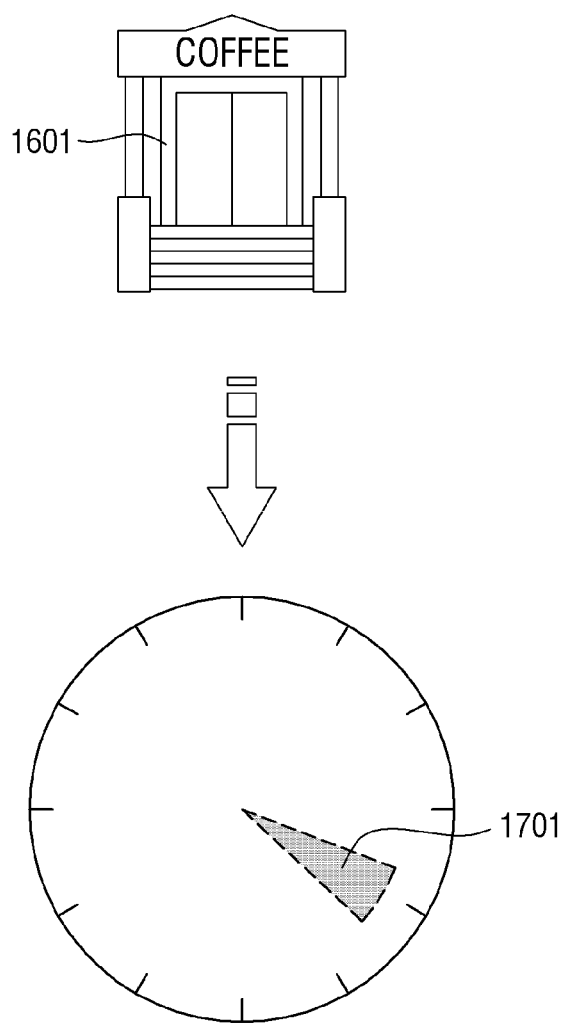
FIGS. 17 to 18 are conceptual diagrams for describing in detail a method of determining whether the registered usage time in step S325 of FIG. 15 includes a time, for which the first content is played.
Figure 18:
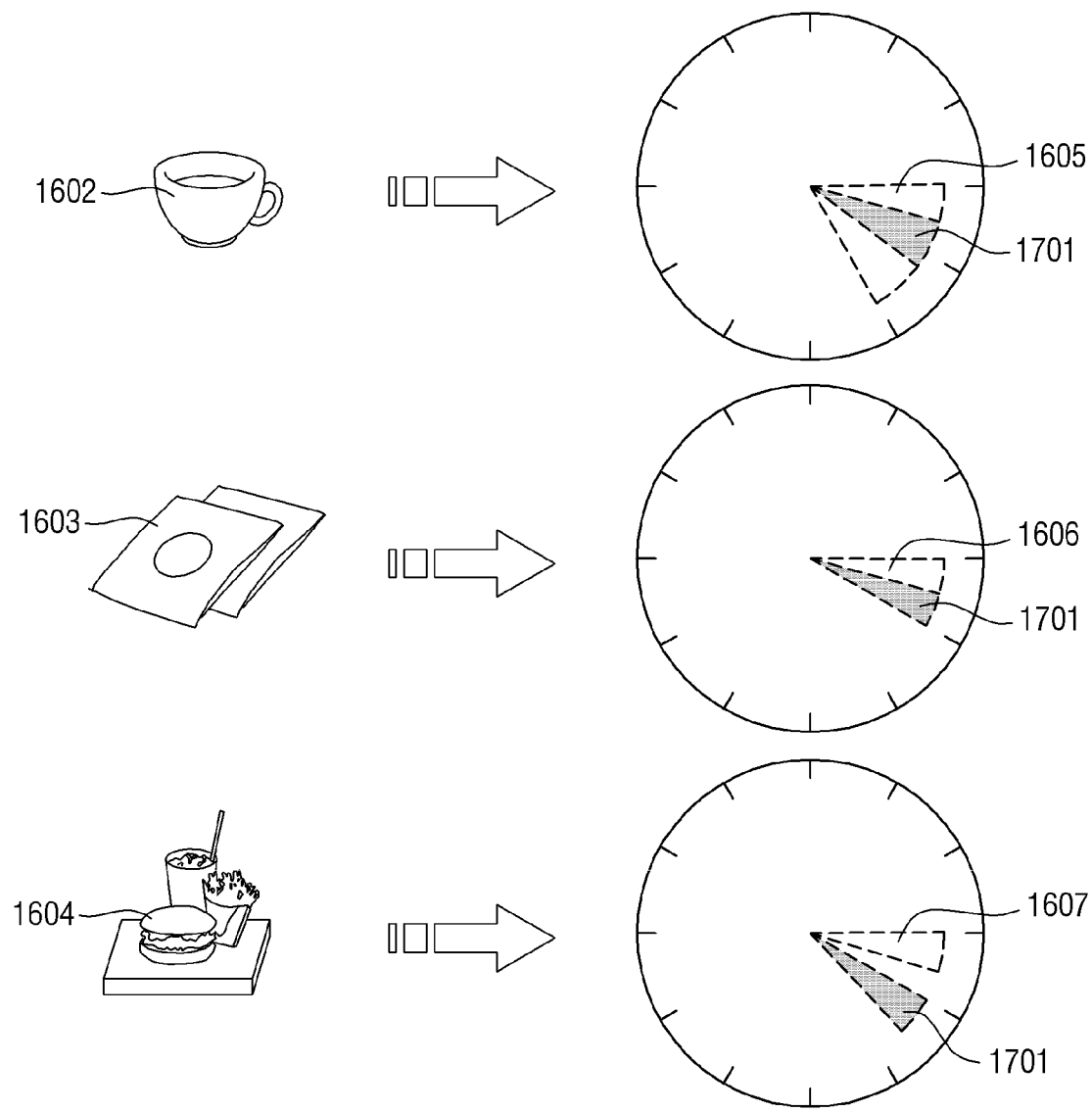

As shown in FIG. 17, it is assumed that the playback time 1701 of the first content in the coffee shop 1601, which is the first space, is from 3:18 to 3:23. Referring to FIG. 18, a first time ticket 1605 registered by purchasing a coffee pot 1602, which is an expensive item among items sold in a coffee shop, includes a first content playback time 1701. Therefore, it can be corrected so that the user of the user terminal, in which the first time ticket is registered, is included in the number of users, who consumed the first content.

The second time ticket 1606 registered by purchasing the coffee beans 1603 includes only a part of the first content playback time 1701. Therefore, it can be corrected so that the user of the user terminal, in which the second time ticket 1606 is registered, is included in the number of users only as long as the time for consuming the first content.

Finally, the third time ticket 1607 registered by purchasing the coffee or sandwich 1604 does not include the first content playback time 1701. Therefore, the number of users may not be corrected for the user of the user terminal, in which the third time ticket 1607 is registered.

In some embodiments, when the ticket gate of the space is clearly present, the method of correcting the number of users may use a method of correcting the number of users by using the entry of the ticket gate. This will be described with reference to FIGS. 19 to 20.

Figure 19:
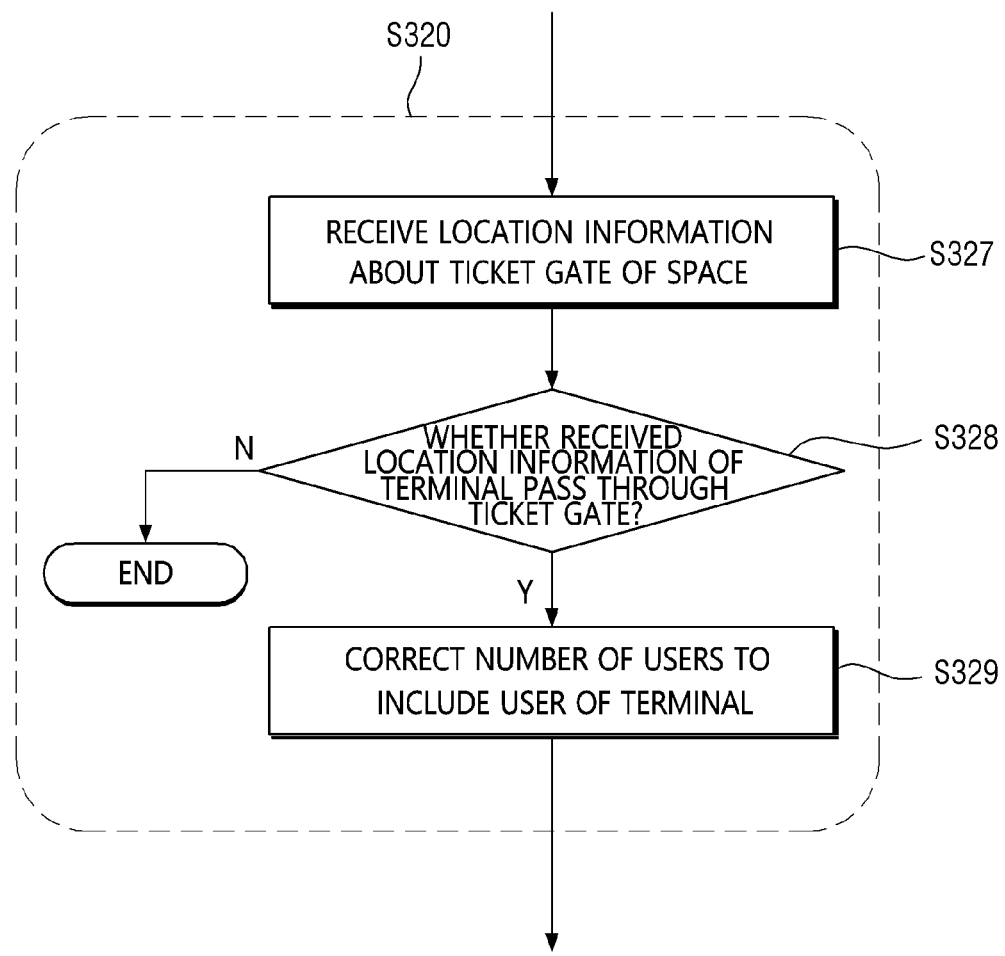
FIG. 19 is another flowchart for describing a method of correcting the number of users in step S320 of FIG. 6.
Figure 20:
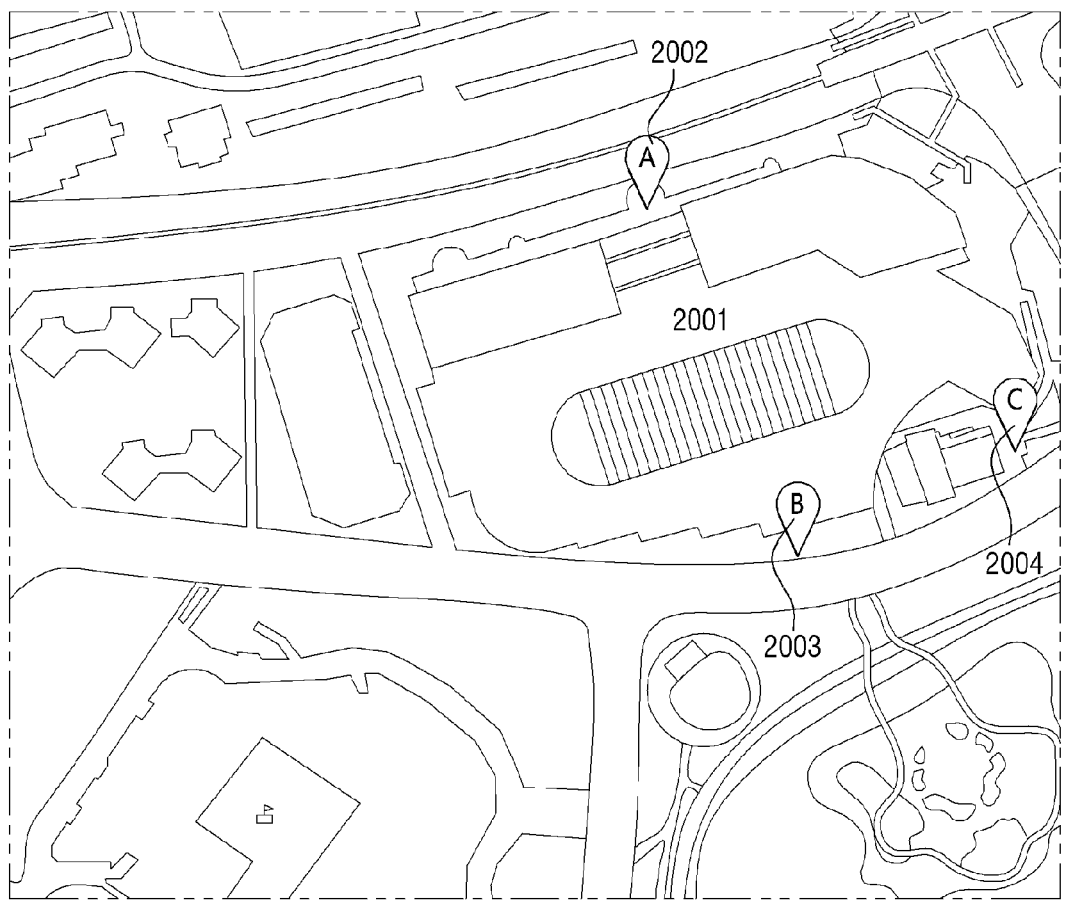
FIG. 20 is a conceptual diagram for describing in detail the method of correcting the number of users of FIG. 19.

Referring to FIG. 19, first, location information on a ticket gate of a first space is received (S327). Here, the ticket gate of the first space means the entrance of the space. For example, referring to FIG. 20, the first space 2001 is an amusement park, and the first space has three ticket gates 2001, 2002, and 2003.

Referring back to FIG. 19, it is determined whether the user passes through the ticket gate using the location information of the user terminal received in step S327 (S328). Here, when it is determined in step S328 that the user passes through the ticket gate, step S329 is performed, and when it is determined that the user does not pass through the ticket gate, the process ends.

If it is determined in step S328 that the user passes through the ticket gate, the number of users is corrected to include the number of user terminals (S329). At this time, it may be corrected so that the user terminal is located in the space from the time of first entering through the ticket gate to the time of exiting through the ticket gate.

In some embodiments, a method of correcting the number of users, in which the user terminal is excluded from the number of users when an earphone is connected to the user terminal, may be used. It will be described with reference to FIG. 21.

Figure 21:
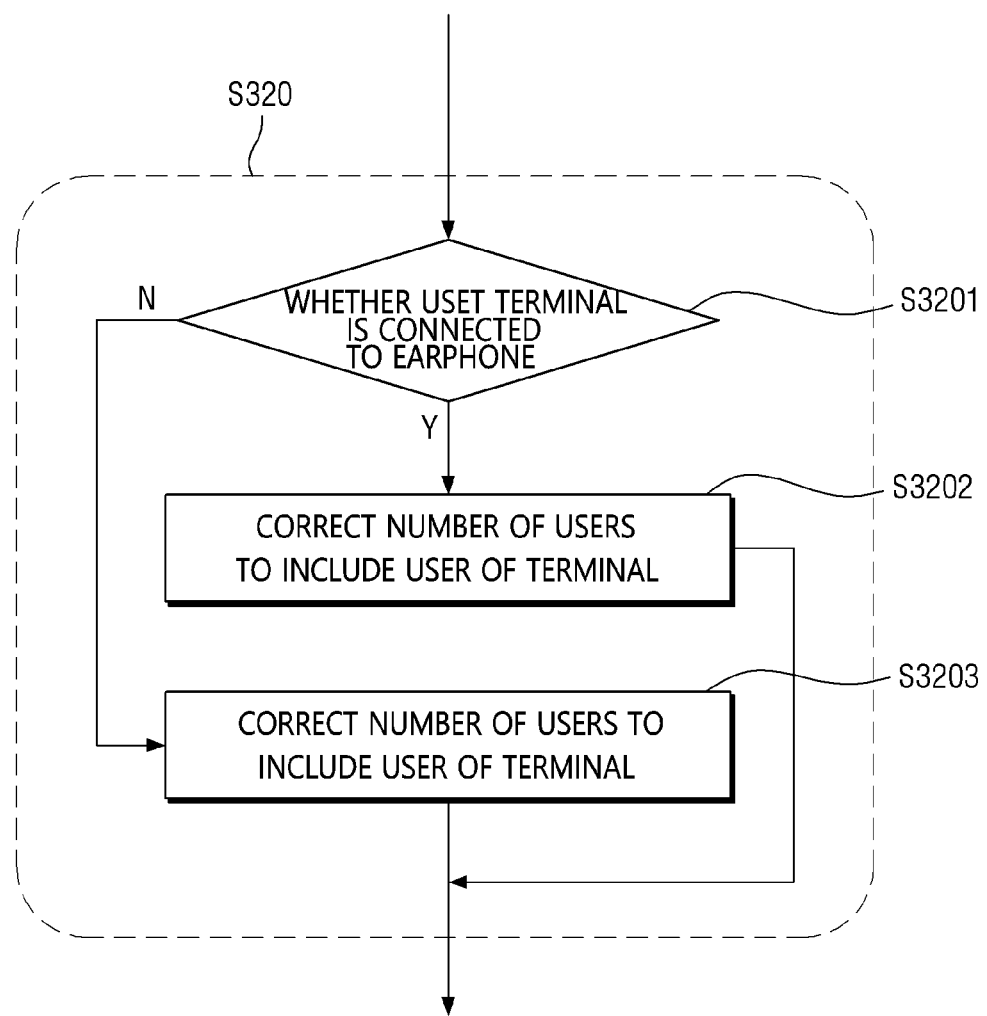
FIG. 21 is another flowchart for describing the method of correcting the number of users in step S320 of FIG. 6.

Referring to FIG. 21, first, it is determined whether an earphone is connected to the user terminal (S3201). For example, the earphone connection state information may be obtained from the user terminal, and the earphone connection state information may be used to determine whether the earphone is currently connected to the user terminal. However, it is not limited thereto.

Next, when it is determined that the earphone is connected to the user terminal through step S3201, it is corrected so that the user of the terminal is excluded from the number of users (S3202). On the contrary, if it is determined that the earphone is not connected to the user terminal, it is corrected so that the user of the terminal is included in the number of users (S3203). That is, when the user terminal connects the earphone and consumes separate content or performs a function such as a call, the user terminal is excluded from the number of users. When the earphone is connected to the user terminal while the first content is playing, the correction may be made to provide the more accurate number of users by excluding the user terminal from the number of users, who consumed the first content.

Referring back to FIG. 3, a first reward for the content is calculated using the number of users measured in step S300 and the first content playback record, and the calculated first reward is provided to the account of the producer linked to the producer terminal of the content (S400). It will be described with reference to FIGS. 22 to 27.

Figure 22:
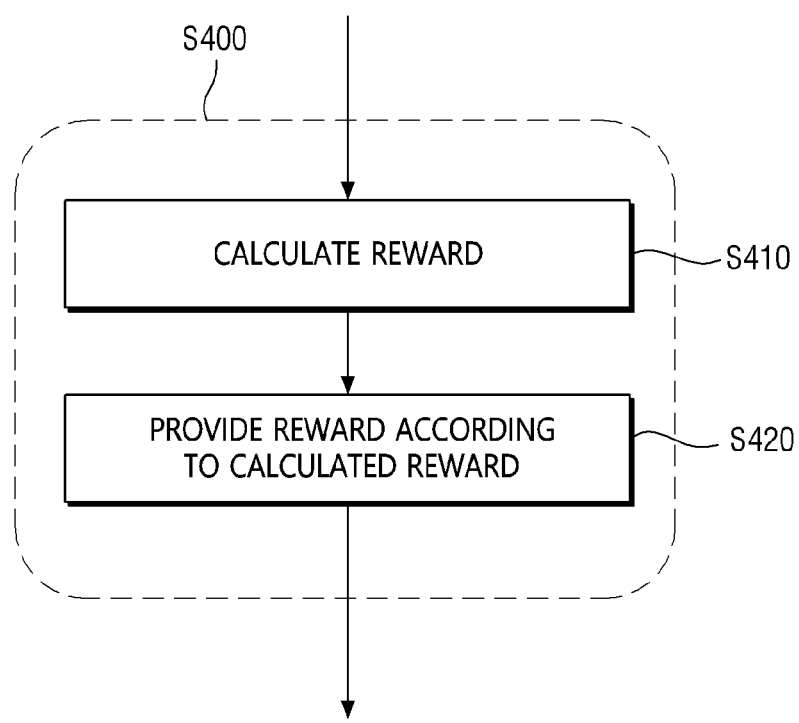
FIG. 22 is a flowchart for describing the method of providing a first reward to a content producer in step S400 of FIG. 6.

FIG. 22 is a flow chart illustrating a method of providing a reward to the content producer.

Referring to FIG. 22, first, a reward amount for content is calculated (S410). For example, the reward amount may be measured using the number of users at the moment the content is played. However, in the case of advertising content, it is unfair to use the number of users during the time, for which the advertising content is played, and the object, to which the reward is given, should be different from other contents.

Figure 23:
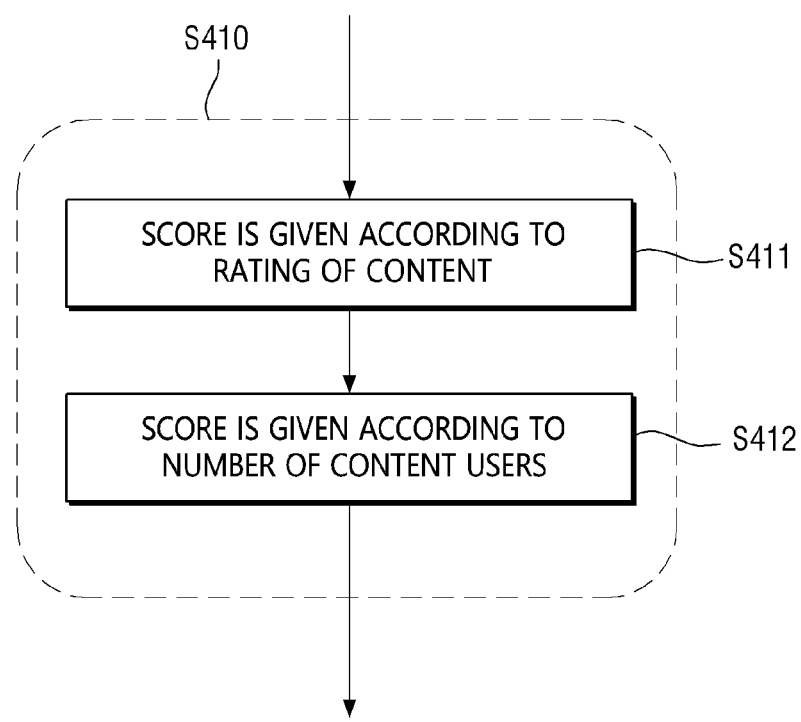
FIG. 23 is a flowchart for describing the method of calculating a reward in step S410 of FIG. 22.

In some embodiments, if the content is not advertising content, the reward amount may be determined by the total time spent of the corresponding content X the rating of the content. In this case, the total consuming time may be determined by the number of people in the space X the playback time of the corresponding content. Referring to FIG. 23, a score is given according to the rating of the content (S411). At this time, the rating of the content may be determined by the type, length, review scores of the user, and the like. Next, a score is given according to the number of users consuming content (S412). However, it is not limited thereto, and the reward may be calculated according to various conditions.

Referring back to FIG. 22, the reward amount determined through the step S410 is paid as a reward (S420). Here, the reward includes everything provided in various ways, such as cash, coupons, points, gift certificates, as well as cryptocurrency. Further, the account may be an account used only in the APP, or may be an account independent of the community service.

In some embodiments, the reward may include cryptocurrency, and the app may be the dApp. In this case, a reward may be provided in a form, in which the cryptocurrency is stored in a wallet connected to the dApp in advance through an exchange. However, it is not limited thereto.

If the content is not advertising content, the reward is awarded to a content producer, that is, a content creator. It will be descried with reference to FIG. 24.

Figure 24:
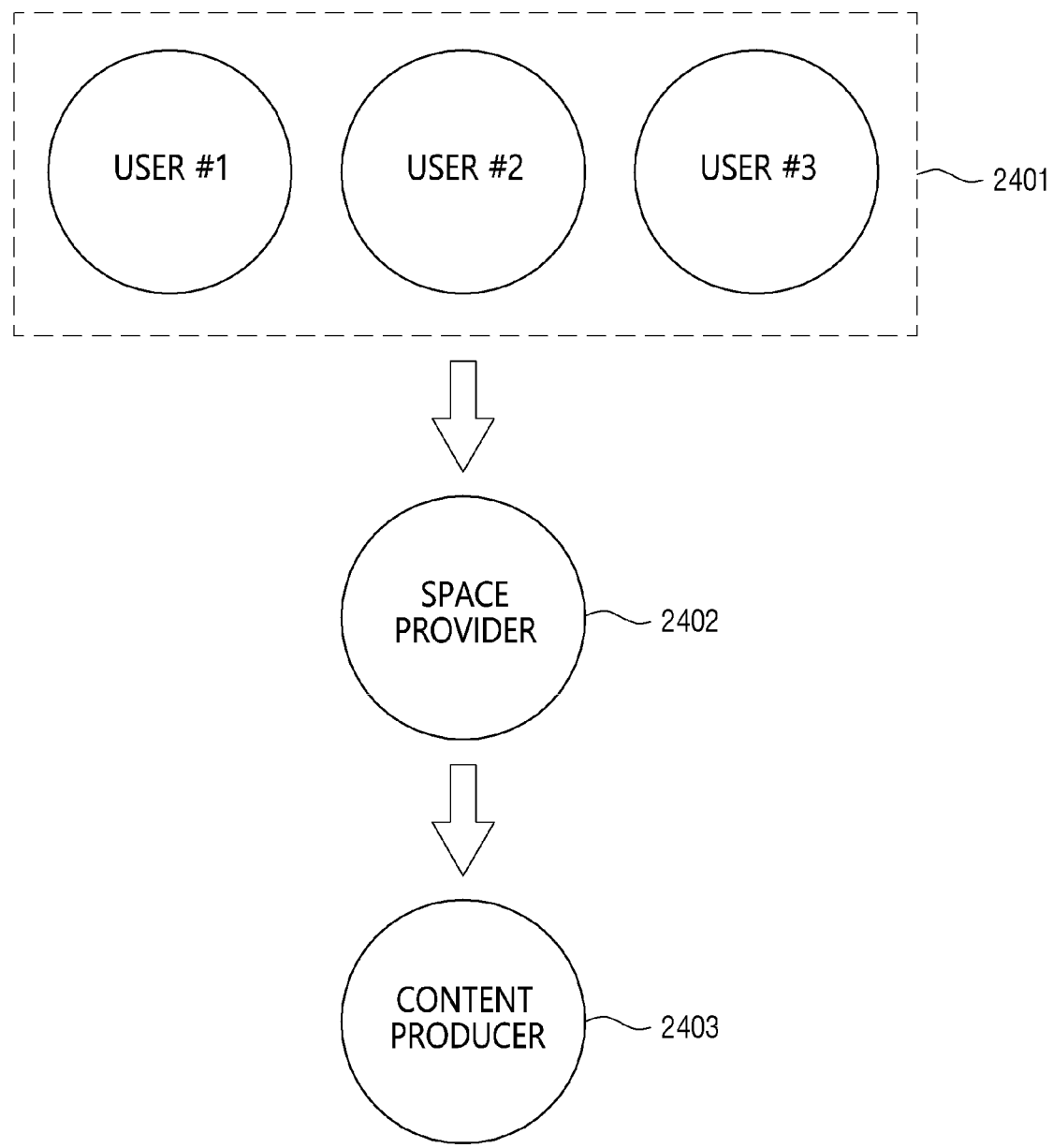
FIG. 24 is a conceptual diagram for describing in detail the method of providing a first reward to the content producer of FIG. 22.

Referring to FIG. 24, all users 2401 having a time ticket of the space for content played in an account of the space provider 2402 (for example, an amusement park) according to the usage time of the space are users of the content. A reward is provided to the content producer 2403 according to the number of users 2401 and the rating of the content. That is, the effect that content revenue can be calculated by linking the time ticket system to the space may be yielded.

In addition, the time ticket system can prevent copyright infringement since only the content producer can register the produced content. Furthermore, it will be effective to increase content consumption by presenting a legitimate profit model to those, who share it using a space.

One of the biggest problems we face in the content market, especially the music market, is the noise in terms of copyright, distribution right and performance right in crowded places, such as cafes, amusement parks and shopping parks. Based on the time pi according to some embodiments of the present invention, there will be an effect to solve such noise.

So far, the method of providing rewards of the content to the content producers as a reward when the content is not advertising content has been described.

Hereinafter, referring to FIG. 25, a reward providing method, in the case where the content is advertising content, will be described.

Figure 25:
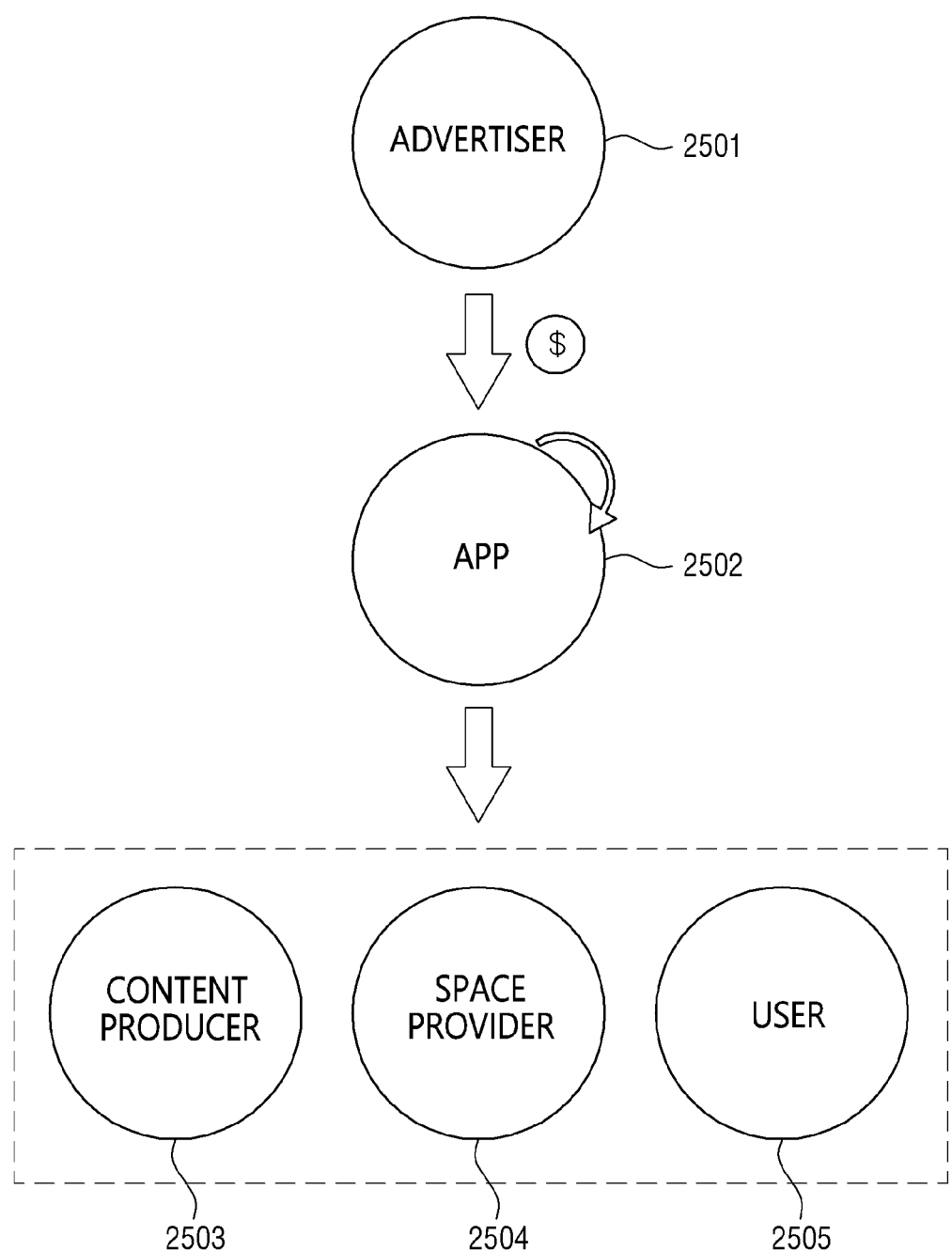
FIG. 25 is a conceptual diagram for describing a method of providing a reward when content is advertising content.

Referring to FIG. 25, first, an advertiser 2501 pays an advertisement fee to a company 2502 serving an APP. Content producers 2503 produce various contents and register them as contents in the APP, and audio and video advertisements are played at regular intervals when the contents are played.

In some embodiments, a part of the advertisement revenue coming into the company 2502 serving the APP may be provided to the content producer 2503. If there are a large number of content producers, the revenue will be divided by the producer's revenue ratio. The producer's revenue ratio can be measured in a variety of ways. For example, the producer's revenue ratio could be calculated according to (the number of users located in the first space while the content producer's content is playing)*(the time, for which the content is played)/(sum of time that each user located in the first space consumed the content). Hereinafter, it will be described with reference to FIG. 26.

Figure 26:
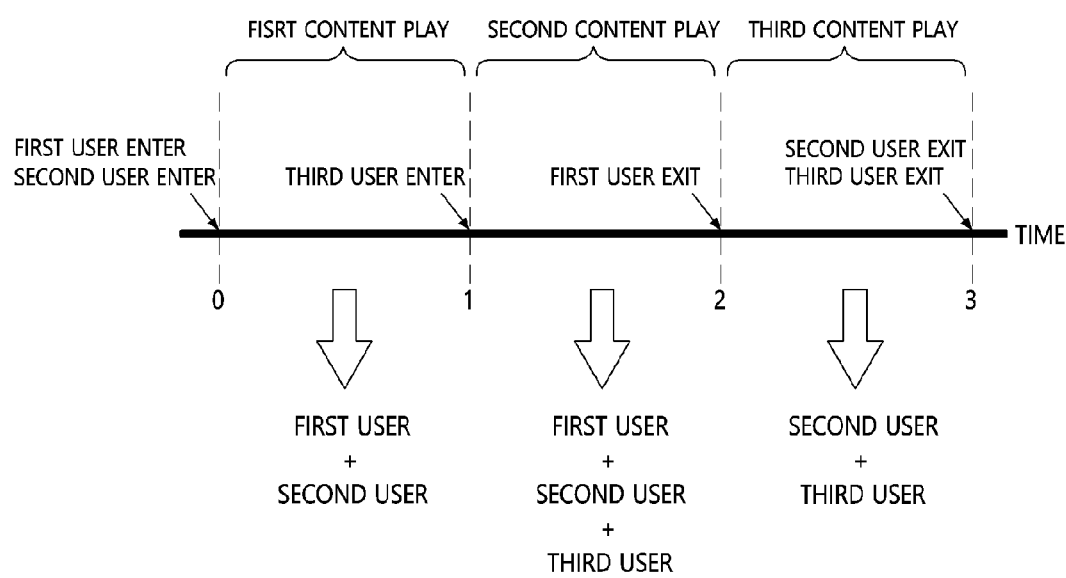
FIG. 26 is a conceptual diagram for describing in detail a method of calculating a revenue ratio of content producers when a plurality of content producers provide content.

As shown in FIG. 26, it is assumed that the first content, the second content, and the third content each having an amount of one hour are generated from the first content producer, the second content producer, and the third content producer, respectively, are played in the first space, and the first user, the second user, and the third user enter or exit while the first content, the second content, and the third content are playing as shown in FIG. 26.

First, when calculating the revenue ratio of the first content producer that produced the first content, it can be seen that the time spent by each user located in the first space is 2 hours of the first user, 3 hours of the second user and 2 hours of the third user, and the total time that each user in the first space consumed the content is 7 hours.

Here, considering that users located in the first space while the first content is playing are two of the first user and the second user and the time, for which the first content is played, is one hour, the revenue ratio of the first content producer is (2)*(1)/(7), which is 2/7.

By calculating the revenue ratio of the second content producer and the third content producer through the above method, the revenue ratio of the second content producer is (3)*(1)/7, which is 3/7, and the revenue ratio of the third content producer is (2)*(1)/(7), which is 2/7.

That is, the first content producer, the second content producer, and the third content producer each take revenue in the ratio of 2:3:2 with respect to the advertisement revenue. However, the present invention is not limited thereto, and any method of dividing the revenue to be shared to a plurality of content producers may be applied. In some embodiments, if there is a user, who enters or exits the first space in the middle of playing each content, the revenue ratio may be calculated by excluding the number of users, who enter or exit in the middle of playing the content. However, it is not limited thereto.

Referring back to FIG. 25, in some embodiments, a portion of the advertisement revenue that comes into the company 2502 serving the APP may be provided to the space provider 2504. In this case, when the space provider directly selects and plays an advertisement to be played in his or her space, the space provider may have to give up the revenue for playing the advertisement. Rather, it may be necessary to provide an advertisement fee according to the advertisement content play to the company 2502 serving the APP.

In some embodiments, a portion of the advertisement revenue coming into the company 2502 serving the APP may be provided to the user 2505 as well. Rewards may be provided in proportion to the time that the user 2505 used the space.

In some embodiments, the advertisement revenue sharing distribution database may be processed by a special database.

Both the audio/video database system of the content playback system and the blockchain work together, which can have an innovative effect in terms of a time slot. For example, when an advertiser selects an advertisement time slot, the advertiser may think about whether the advertisement is audio or video, and then purchase the advertisement time slot through a table, in which the consumption time slot of each content is analyzed through big data. At this time, the advertisement price according to the time slot may be given differentially.

The user can also select the playback duration of an advertisement while viewing the advertisement. For example, while viewing the advertisement, an item that can adjust the limit time of the time plate is created and can be used at any time as long as the item is held.

Hereinafter, an exemplary computing device 400 that can implement an apparatus and a system, according to various embodiments of the present disclosure will be described.

Figure 27:
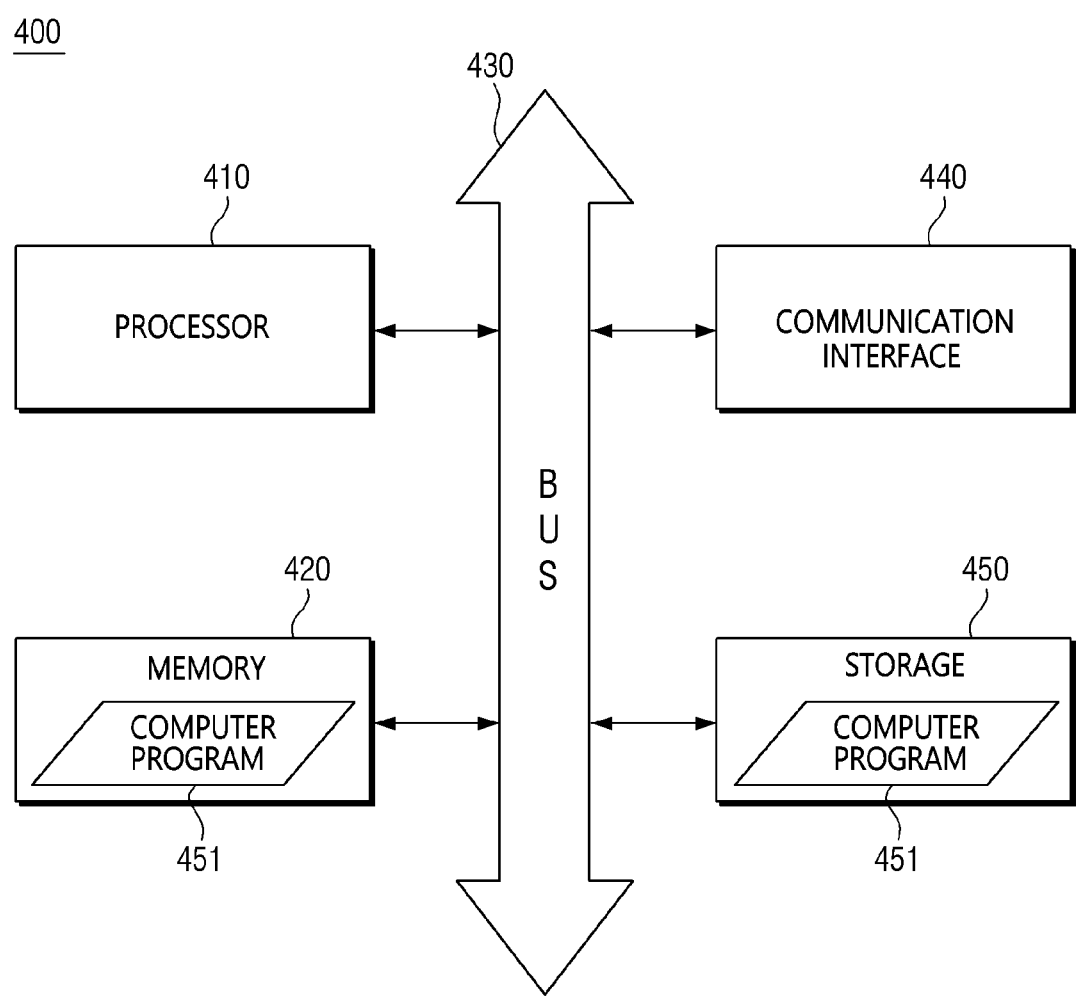
FIG. 27 is a hardware block diagram illustrating an exemplary computing device that can implement an apparatus according to various embodiments of the present disclosure.

FIG. 27 is an example hardware diagram illustrating a computing device 400.

As shown in FIG. 27, the computing device 400 may include one or more processors 410, a memory 420 which loads a computer program executed by the processors 410, a bus 430, a communication interface 440, and a storage 450 for storing the computer program 451. However, FIG. 27 illustrates only the components related to the embodiment of the present disclosure. Therefore, it will be appreciated by those skilled in the art that the present disclosure may further include other general purpose components in addition to the components shown in FIG. 27.

The processor 410 controls overall operations of each component of the computing device 400. The processor 410 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 410 may perform calculations on at least one application or program for executing a method/operation according to various embodiments of the present disclosure. The computing device 400 may have one or more processors.

The memory 420 stores various data, instructions and/or information. The memory 420 may load one or more programs 451 from the storage 450 to execute methods/operations according to various embodiments of the present disclosure. An example of the memory 420 may be a volatile memory such as a RAM, but is not limited thereto.

The bus 430 provides communication between components of the computing device 400. The bus 430 may be implemented as various types of bus such as an address bus, a data bus and a control bus.

The communication interface 440 supports wired and wireless internet communication of the computing device 400. The communication interface 440 may support various communication methods other than internet communication. To this end, the communication interface 440 may be configured to comprise a communication module well known in the art of the present disclosure.

The storage 450 can non-temporarily store one or more computer programs 451. The storage 450 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 451 may include one or more instructions, on which the methods/operations according to various embodiments of the present disclosure are implemented. When the computer program 451 is loaded on the memory 420, the processor 410 may perform the methods/operations in accordance with various embodiments of the present disclosure by executing the one or more instructions.

The technical features of the present disclosure described with reference to FIGS. 1 through 27 so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for providing a reward based on consumption of content performed by a computing device comprising:
querying a user terminal located in a first space by using location information of a first space;
measuring the number of users located in the first space according to the number of the queried user terminals and a first content playback record; and
calculating a first reward for the first content by using the measured number of users and the first content playback record, and providing the first reward to an account of a producer linked to a producer terminal of the first content, wherein measuring the number of users comprises,
obtaining earphone connection state information from the user terminal, and correcting, by using the earphone connection state information, the number of the users so that a user terminal, to which an earphone is connected at a time when the first content is played, is excluded from the number of the uses.

2. The reward providing method of claim 1,
wherein querying a user terminal comprises,
querying a user terminal located within an area of the first space by using location information of the user terminal,
wherein measuring the number of users comprises,
measuring the number of users by counting the number of user terminals located within an area of the first space while the first content is playing.

3. The reward providing method of claim 1,
wherein measuring the number of users comprises,
correcting the number of users so that the user terminal is included in the number of users if the first content is played between a time when the user terminal first passes through an entrance of the first space and a time when the user terminal passes again through the entrance of the first space.

4. The reward providing method of claim 1, further comprises,
recording the first content playback record in an account of a space provider linked to a space provider terminal of the first space,
wherein providing the first reward comprises,
providing a second reward corresponding to the measured first reward to an account of the space provider.

5. The reward providing method of claim 4,
wherein the first content includes a second content selected from an account of the space provider and a third content provided from a content providing service,
wherein providing a second reward corresponding to the measured first reward to an account of a space provider linked to the first space comprises,
providing, if the second content is played, a reward, which is less than when the third content is played, to an account of the space provider.

6. The reward providing method of claim 1,
wherein providing the first reward comprises,
providing a second reward to an account of a user linked to a user terminal located in the first space and an account of a space provider linked to a space provider terminal of the first space if the first content is advertising content.

7. The reward providing method of claim 6,
wherein providing the second reward further comprises,
providing, if the advertising content is advertising content selected and played from an account of the space provider, the second reward only to an account of the user while excluding the account of the space provider.

8. The reward providing method of claim 7,
wherein providing the second reward comprises,
recording a record of providing the second reward into a specially processed database.

9. The reward providing method of claim 1,
wherein a rating of the first content has a higher rating as a playing length of the first content is longer,
wherein providing the first reward comprises,
correcting the first reward by using the rating of the first content.

10. The reward providing method of claim 1,
wherein a rating of the first content has a higher rating than voice content when the first content is video content.

11. The reward providing method of claim 1,
wherein providing the first reward comprises,
recording location information of the user terminal in an account of the user linked to the user terminal and providing a reward to the user account by using the recorded location information of the user terminal.

12. The reward providing method of claim 1,
wherein the reward includes cryptocurrency,
wherein providing the first reward comprises,
providing the first reward through a wallet connected to dApp used by a user of the user terminal.

13. The reward providing method of claim 1,
wherein the information about the user includes admission ticket data for entering the first space,
wherein measuring the number of users comprises,
correcting the number of the users by using time information included in the admission ticket data so that a user of the user terminal located in the first space at a time, for which the first content is played is included in the number of the users.

14. The reward providing method of claim 13,
wherein measuring the number of users comprises,
extracting, if the received admission ticket data is image data, a character string indicating location information by decoding the image data;
generating a usage time of a user of the user terminal for the first space by using the character string indicating the location information; and
correcting the number of the users so that a user of the user terminal is included in the number of the users if the usage time includes a time, for which the first content is played.

15. The reward providing method of claim 1,
wherein the information about the user includes purchase information about an item sold in the first space,
wherein measuring the number of users comprises,
using the purchase information to register a usage time of the first space in a user account linked to the user terminal located in the first space, and correcting the number of the users so that a user of the user terminal is included in the number of the users if the registered usage time includes a time, for which the first content is played.

16. A method for providing a reward based on consumption of content performed by a computing device, comprising:
obtaining information about a userof the user terminal entering a first s pace from a space provider terminal;
measuring the number of users located in the first space according to the information about the user; and
calculating a first reward for the first content by using the measured number of users and a first content playback record in the first space, and providing the first reward to an account of a producer linked to a producer terminal of the first content,
wherein measuring the number of users comprises, obtaining earphone connection state information from the user terminal, and correcting, by using the earphone connection state information, the number of the users so that a user terminal, to which an earphone is connected at a time when the first content is played, is excluded from the number of the uses.

* * * * *